US012093423B2

(12) United States Patent
Chalk et al.

(10) Patent No.: US 12,093,423 B2
(45) Date of Patent: Sep. 17, 2024

(54) SYSTEMS AND METHODS FOR MULTI-ALGORITHM PROCESSING OF DATASETS WITHIN A ZERO-TRUST ENVIRONMENT

(71) Applicant: BeeKeeperAI, Inc., Larkspur, CA (US)

(72) Inventors: Mary Elizabeth Chalk, Austin, TX (US); Robert Derward Rogers, Oakland, CA (US)

(73) Assignee: BeeKeeperAI, Inc., Austin, TX (US)

( * ) Notice: Subject to any disclaimer, the term of this patent is extended or adjusted under 35 U.S.C. 154(b) by 253 days.

(21) Appl. No.: 17/955,331

(22) Filed: Sep. 28, 2022

(65) Prior Publication Data

US 2023/0103681 A1    Apr. 6, 2023

Related U.S. Application Data

(63) Continuation-in-part of application No. 17/953,215, filed on Sep. 26, 2022, and a continuation-in-part of application No. PCT/US2022/044870, filed on Sep. 27, 2022.

(60) Provisional application No. 63/277,149, filed on Nov. 8, 2021, provisional application No. 63/252,131, filed on Oct. 4, 2021.

(51) Int. Cl.
G06F 21/62     (2013.01)
G06F 21/60     (2013.01)

(52) U.S. Cl.
CPC ........ *G06F 21/6245* (2013.01); *G06F 21/602* (2013.01)

(58) Field of Classification Search
CPC .......................... G06F 21/6245; G06F 21/602
See application file for complete search history.

(56) References Cited

U.S. PATENT DOCUMENTS

| 8,346,534 B2 | 1/2013 | Csomai et al. |
| 9,002,002 B1 | 4/2015 | Poo et al. |
| 10,133,878 B2 | 11/2018 | Horvitz |
| 11,409,993 B2 | 8/2022 | Ghosh |

(Continued)

OTHER PUBLICATIONS

ISA/US, "Notification of Transmittal of the ISR and the Written Opinion of the International Searching Authority, or the Declaration" in PCT Application No. PCT/US2022/044870, Mar. 10, 2023, 13 pages.

(Continued)

*Primary Examiner* — Brian F Shaw
(74) *Attorney, Agent, or Firm* — Kang S. Lim

(57) ABSTRACT

Systems and methods for the processing of diverse datasets by divergent algorithms within a zero-trust environment is provided. In some embodiments, a single data steward may receive multiple algorithms in a zero-trust environment. Alternatively, algorithm output may be obfuscated for sharing with the algorithm developer for validation, or to compare against the output of a different data steward's processed protected information, for example PHI. In such situations the hashed identifying information may be matched using AI models. In yet other embodiments, the output of one data steward's protected information may be provided in a zero-trust manner to the sequestered enclave of a second data steward in order to impact the processing of this second data steward's protected information by a second algorithm.

25 Claims, 27 Drawing Sheets

(56) References Cited

U.S. PATENT DOCUMENTS

| | | |
|---|---|---|
| 2009/0254971 A1 | 10/2009 | Herz et al. |
| 2014/0304505 A1 | 10/2014 | Dawson |
| 2017/0243028 A1 | 8/2017 | LaFever et al. |
| 2017/0258390 A1 | 9/2017 | Newton |
| 2018/0041477 A1 | 2/2018 | Shaposhnik |
| 2018/0150609 A1 | 5/2018 | Kim |
| 2018/0182037 A1 | 6/2018 | Lange et al. |
| 2018/0294047 A1 | 10/2018 | Hosseini et al. |
| 2018/0359084 A1 | 12/2018 | Jain et al. |
| 2020/0082270 A1 | 3/2020 | Gu |
| 2020/0104705 A1 | 4/2020 | Bhowmick |
| 2021/0092185 A1 | 3/2021 | Derosa-Grund |
| 2021/0141940 A1* | 5/2021 | Naqvi .................. G06F 21/602 |
| 2021/0150037 A1 | 5/2021 | Radhakrishnan et al. |
| 2021/0173854 A1 | 6/2021 | Wilshinsky |
| 2022/0092216 A1 | 3/2022 | Mohassel |

OTHER PUBLICATIONS

ISA/US, "Notification of Transmittal of the ISR and the Written Opinion of the International Searching Authority, or the Declaration" in PCT Application No. PCT/US2022/045463, Apr. 7, 2023, 17 pages.

Deumens et al. Secure Research infrastructure Using tiCrypt. Jul. 22, 2021 (Jul. 22, 2021) [retrieved on Mar. 14, 2022]. Retrieved from the internet <URL: https://dl.acm.org/doi/pdf/10.1145/3437359.3465577> entire document.

* cited by examiner

SYSTEMS AND METHODS FOR MULTI-ALGORITHM PROCESSING OF DATASETS WITHIN A ZERO-TRUST ENVIRONMENT

CROSS REFERENCE TO RELATED APPLICATIONS

This non-provisional U.S. application claims the benefit and priority of U.S. Provisional Application No. 63/277,149, filed Nov. 8, 2021. Additionally, this application claims the benefit and priority and is a Continuation-In-Part of U.S. application Ser. No. 17/953,215, filed Sep. 26, 2022, currently pending, which claims the benefit and priority of U.S. Provisional Application No. 63/252,131, filed Oct. 4, 2021. Also, this application claims the benefit and priority and is a Continuation-In-Part of PCT Application No. PCT/US2022/044870, filed Sep. 27, 2022, currently pending, which all applications are incorporated herein in their entirety by this reference.

BACKGROUND

The present invention relates in general to the field of zero-trust computing, and more specifically to methods, computer programs and systems for providing processing of protected information using algorithms in a zero-trust environment. Such systems and methods are particularly useful in situations where algorithm developers wish to maintain secrecy of their algorithms, and the data being processed is highly sensitive, such as protected health information. For avoidance of doubt, an algorithm may include a model, code, pseudo-code, source code, or the like.

Within certain fields, there is a distinguishment between the developers of algorithms (often machine learning of artificial intelligence algorithms), and the stewards of the data that said algorithms are intended to operate with and be trained by. On its surface this seems to be an easily solved problem of merely sharing either the algorithm or the data that it is intended to operate with. However, in reality, there is often a strong need to keep the data and the algorithm secret. For example, the companies developing their algorithms may have the bulk of their intellectual property tied into the software comprising the algorithm. For many of these companies, their entire value may be centered in their proprietary algorithms. Sharing such sensitive data is a real risk to these companies, as the leakage of the software base code could eliminate their competitive advantage overnight.

One could imagine that instead, the data could be provided to the algorithm developer for running their proprietary algorithms and generation of the attendant reports. However, the problem with this methodology is two-fold. Firstly, often the datasets for processing and extremely large, requiring significant time to transfer the data from the data steward to the algorithm developer. Indeed, sometimes the datasets involved consume petabytes of data. The fastest fiber optics internet speed in the US is 2,000 MB/second. At this speed, transferring a petabyte of data can take nearly seven days to complete. It should be noted that most commercial internet speeds are a fraction of this maximum fiber optic speed.

The second reason that the datasets are not readily shared with the algorithm developers is that the data itself may be secret in some manner. For example, the data could also be proprietary, being of a significant asset value. Moreover, the data may be subject to some control or regulation. This is particularly true in the case of medical information. Protected health information, or PHI, for example, is subject to a myriad of laws, such as HIPAA, that include strict requirements on the sharing of PHI, and are subject to significant fines if such requirements are not adhered to.

Healthcare related information is of particular focus of this application. Of all the global stored data, about 30% resides in healthcare. This data provides a treasure trove of information for algorithm developers to train their specific algorithm models (AI or otherwise), and allows for the identification of correlations and associations within datasets. Such data processing allows advancements in the identification of individual pathologies, public health trends, treatment success metrics, and the like. Such output data from the running of these algorithms may be invaluable to individual clinicians, healthcare institutions, and private companies (such as pharmaceutical and biotechnology companies). At the same time, the adoption of clinical AI has been slow. More than 12,000 life-science papers described AI and ML in 2019 alone. Yet the U.S. Food and Drug Administration (FDA) has only approved only slightly more than 30 AI/ML-based medical technologies to date. Data access is a major barrier to clinical approval. The FDA requires proof that a model works across the entire population. However, privacy protections make it challenging to access enough diverse data to accomplish this goal.

Given that there is great value in the operation of secret algorithms on data that also must remain secret, there is a significant need for systems and methods that allow for such zero-trust operations. Such systems and methods enable sensitive data to be analyzed in a secure environment, providing the needed outputs, while maintaining secrecy of both the algorithms involved, as well as the data itself.

SUMMARY

The present systems and methods relate to the processing of secret data by secret algorithms in a secure and zero-trust environment. Such systems and methods enable improvements in the ability to identify associations in data that traditionally require some sort of risk to the algorithm developer, the data steward, or both parties. An example of how such a system can benefit patients is that using a model, for example, a clinical decision support tool can be developed, intended to assist providers in targeting patients with diabetic retinopathy to benefit from treatment.

In some embodiments, a zero-trust system is provided where there are a pair of algorithm developers. Each algorithm developer encrypts their own algorithm independently, and transfers the algorithm to a core management system for distribution. The core management system provides both algorithms to a single secure computing node within a single data steward. Once within the sequestered enclave, the algorithms may operate sequentially on the single protected health information (PHI) of the data steward, or may operate in parallel, generating a pair of outputs that may be compared with one another.

In some embodiment, a data steward, once it processes the protected information, for example PHI, with an algorithm, may obfuscate the data by performing an encryption of the N-fields which identify the patient. This encryption may be homomorphic in some embodiments. The entire payload is then encrypted using public-private keys, and the encrypted payload is provided to the algorithm developer. The developer is then able to decrypt the report, but still doesn't have access to the identifying information. As such, the developer is able to validate the operation of their algorithm without the data steward releasing sensitive information. In some particular use cases, the data generated and output by the algorithm may have different versions based upon the intended recipient. Likewise, it may be possible to take the algorithm output and process it to generate different output types. These differing outputs may be provided to different audiences based upon needs, permissions, or the like. For example, a dataset with all identifying information may be output to the algorithm developer, while a data steward may receive the output data with these fields included.

In some embodiments, a data steward first receives an encrypted algorithm from an algorithm developer via the core management system. The data steward, within the confines of a sequestered computing node, is able to decrypt the algorithm and process its protected information, for example PHI, accordingly. The data steward may then encrypt the output and provide it to a second data steward via the core management system. This output is again, only decryptable within the confines of the second data steward's sequestered enclave. A second algorithm is also provided to this second sequestered enclave. The output is then used to either modify the protected information of the second data steward prior to being processed by this second algorithm, or may be an input in addition to the second set of protected information into the second algorithm. The resulting output from this second algorithm is then made available to the second data steward.

There also may be embodiments where data that has been processed by two different data stewards may be compared against each other in a secure manner. In a method similar to the one above where data is obfuscated, the results of the processing of an algorithm on a set of protected information (for example PHI) may have the N-fields that identify the patient hashed. This may occur in two different data stewards, on their own differing protected information (using the same or different algorithms). The two resulting datasets with hashed identifying information may be compared against each other and matches between the patients made. When the hashes are homomorphic encryptions, a robust model (e.g., trained with a very noisy datasets) may be able to directly match the two hashes. Otherwise, a deep learning model may be leveraged, with the layer before the linear classifier leveraged to compare the feature vectors from the given datasets, and the distance between the angles of the given feature vectors is an indication of similarity between the hashed N-fields of identifying information.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1A:
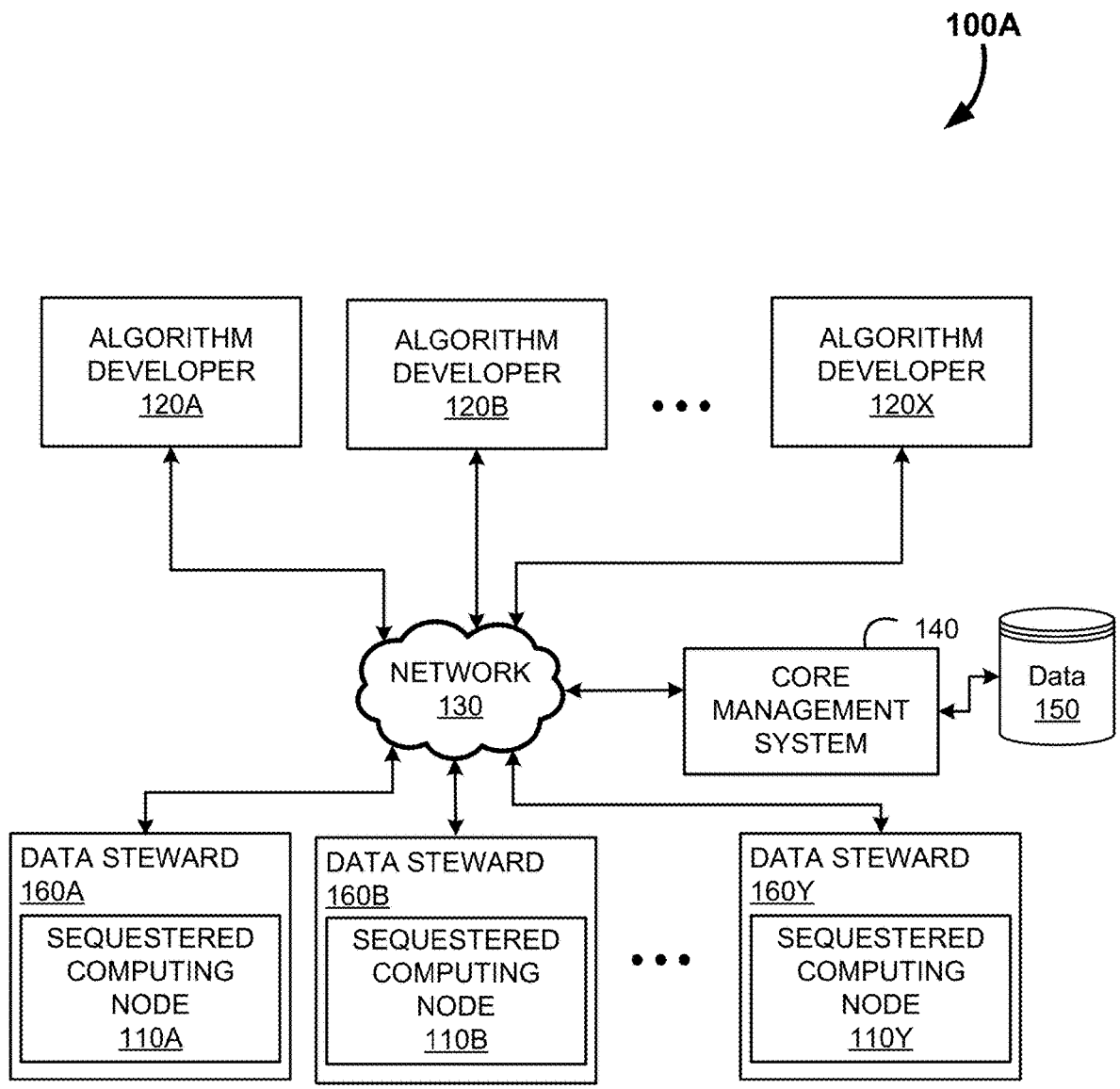
FIGS. 1A and 1B are example block diagrams of a system for zero trust computing of data by an algorithm, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to systems and methods for the zero-trust application on one or more algorithms processing sensitive datasets. Such systems and methods may be applied to any given dataset, but may have particular utility within the healthcare setting, where the data is extremely sensitive. As such, the following descriptions will center on healthcare use cases. This particular focus, however, should not artificially limit the scope of the invention. For example, the information processed may include sensitive industry information, payroll or other personally identifiable information, or the like. As such, while much of the disclosure will refer to protected health information (PHI) it should be understood that this may actually refer to any sensitive type of data. Likewise, while the data stewards are generally thought to be a hospital or other healthcare entity, these data stewards may in reality be any entity that has and wishes to process their data within a zero-trust environment.

In some embodiments, the following disclosure will focus upon the term "algorithm". It should be understood that an algorithm may include machine learning (ML) models, neural network models, or other artificial intelligence (AI) models. However, algorithms may also apply to more mundane model types, such as linear models, least mean squares, or any other mathematical functions that convert one or more input values, and results in one or more output models.

Also, in some embodiments of the disclosure, the terms "node", "infrastructure" and "enclave" may be utilized. These terms are intended to be used interchangeably and indicate a computing architecture that is logically distinct (and often physically isolated). In no way does the utilization of one such term limit the scope of the disclosure, and these terms should be read interchangeably. To facilitate discussions, FIG. 1A is an example of a zero-trust infrastructure, shown generally at 100a. This infrastructure includes one or more algorithm developers 120a-x which generate one or more algorithms for processing of data, which in this case is held by one or more data stewards 160a-y. The algorithm developers are generally companies that specialize in data analysis, and are often highly specialized in the types of data that are applicable to their given models/algorithms. However, sometimes the algorithm developers may be individuals, universities, government agencies, or the like. By uncovering powerful insights in vast amounts of information, AI and machine learning (ML) can improve care, increase efficiency, and reduce costs. For example, AI analysis of chest x-rays predicted the progression of critical illness in COVID-19. In another example, an image-based deep learning model developed at MIT can predict breast cancer up to five years in advance. And yet another example is an algorithm developed at University of California San Francisco, which can detect pneumothorax (collapsed lung) from CT scans, helping prioritize and treat patients with this life-threatening condition—the first algorithm embedded in a medical device to achieve FDA approval.

Likewise, the data stewards may include public and private hospitals, companies, universities, governmental agencies, or the like. Indeed, virtually any entity with access to sensitive data that is to be analyzed may be a data steward.

The generated algorithms are encrypted at the algorithm developer in whole, or in part, before transmitting to the data stewards, in this example ecosystem. The algorithms are transferred via a core management system 140, which may supplement or transform the data using a localized datastore 150. The core management system also handles routing and deployment of the algorithms. The datastore may also be leveraged for key management in some embodiments that will be discussed in greater detail below.

Each of the algorithm developer 120a-x, and the data stewards 160a-y and the core management system 140 may be coupled together by a network 130. In most cases the network is comprised of a cellular network and/or the internet. However, it is envisioned that the network includes any wide area network (WAN) architecture, including private WAN's, or private local area networks (LANs) in conjunction with private or public WANs.

In this particular system, the data stewards maintain sequestered computing nodes 110a-y which function to actually perform the computation of the algorithm on the dataset. The sequestered computing nodes, or "enclaves", may be physically separate computer server systems, or may encompass virtual machines operating within a greater network of the data steward's systems. The sequestered computing nodes should be thought of as a vault. The encrypted algorithm and encrypted datasets are supplied to the vault, which is then sealed. Encryption keys 390 unique to the vault are then provided, which allows the decryption of the data and models to occur. No party has access to the vault at this time, and the algorithm is able to securely operate on the data. The data and algorithms may then be destroyed, or maintained as encrypted, when the vault is "opened" in order to access the report/output derived from the application of the algorithm on the dataset. Due to the specific sequestered computing node being required to decrypt the given algorithm(s) and data, there is no way they can be intercepted and decrypted. This system relies upon public-private key techniques, where the algorithm developer utilizes the public key 390 for encryption of the algorithm, and the sequestered computing node includes the private key in order to perform the decryption. In some embodiments, the private key may be hardware (in the case of Azure, for example) or software linked (in the case of AWS, for example).

In some particular embodiments, the system sends algorithm models via an Azure Confidential Computing environment to two data steward environments. Upon verification, the model and the data entered the Intel SGX sequestered enclave where the model is able to be validated against the protected information, for example PHI, data sets. Throughout the process, the algorithm owner cannot see the data, the data steward cannot see the algorithm model, and the management core can see neither the data nor the model.

The data steward uploads encrypted data to their cloud environment using an encrypted connection that terminates inside an Intel SGX-sequestered enclave. Then, the algorithm developer submits an encrypted, containerized AI model which also terminates into an Intel SGX-sequestered enclave. A key management system in the management core enables the containers to authenticate and then run the model on the data within the enclave. The data steward never sees the algorithm inside the container and the data is never visible to the algorithm developer. Neither component leaves the enclave. After the model runs, the developer receives a performance report on the values of the algorithm's performance along with a summary of the data characteristics. Finally, the algorithm owner may request that an encrypted artifact containing information about validation results is stored for regulatory compliance purposes and the data and the algorithm are wiped from the system.

Figure 1B:
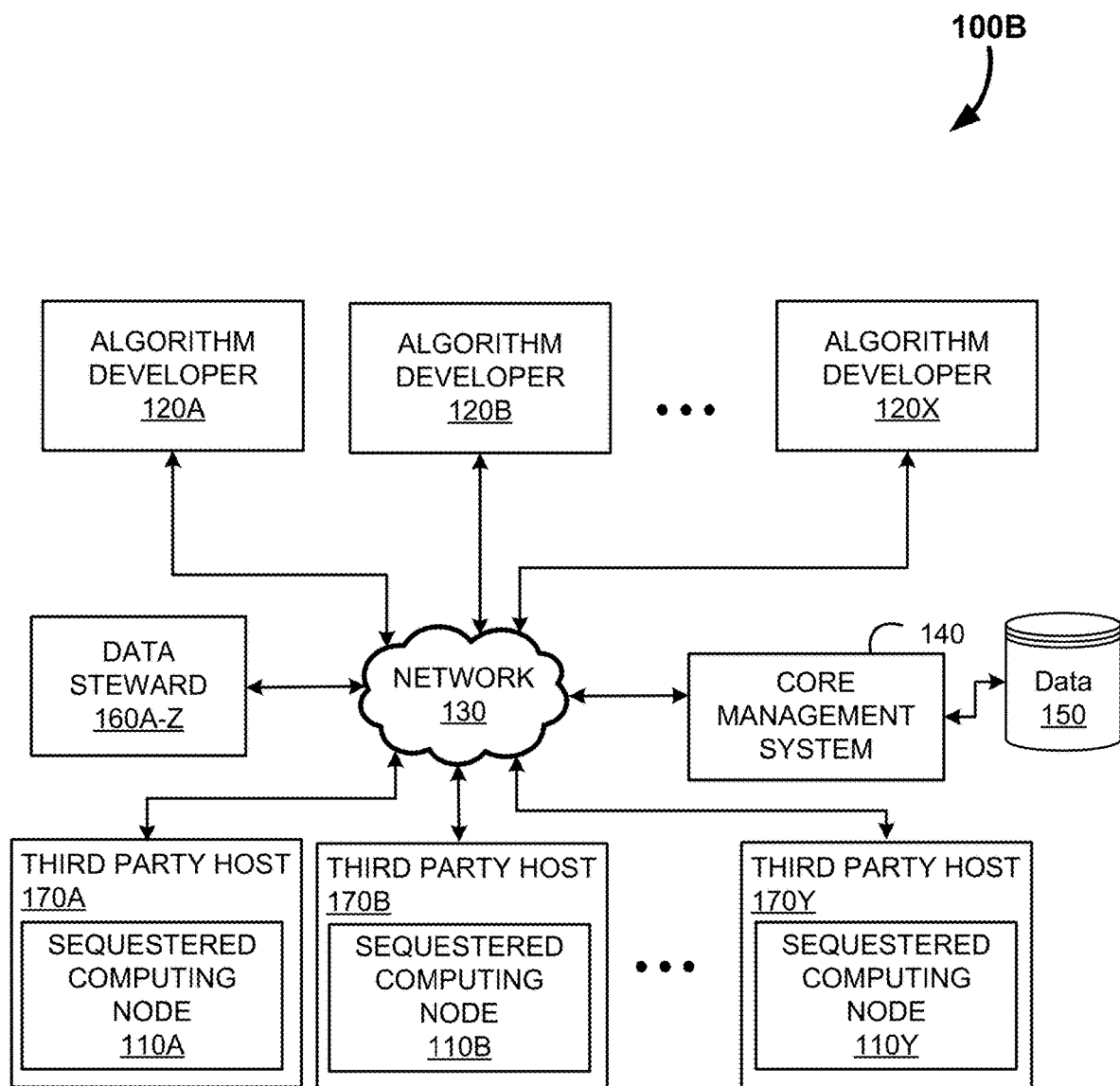

FIG. 1B provides a similar ecosystem 100b. This ecosystem also includes one or more algorithm developers 120a-x, which generate, encrypt and output their models. The core management system 140 receives these encrypted payloads, and in some embodiments, transforms or augments unencrypted portions of the payloads. The major difference between this substantiation and the prior figure, is that the sequestered computing node(s) 110a-y are present within a third party host 170a-y. An example of a third-party host may include an offsite server such as Amazon Web Service (AWS) or similar cloud infrastructure. In such situations, the data steward encrypts their dataset(s) and provides them, via the network, to the third party hosted sequestered computing node(s) 110a-y. The output of the algorithm running on the dataset is then transferred from the sequestered computing node in the third-party, back via the network to the data steward (or potentially some other recipient).

In some specific embodiments, the system relies on a unique combination of software and hardware available through Azure Confidential Computing. The solution uses virtual machines (VMs) running on specialized Intel processors with Intel Software Guard Extension (SGX), in this embodiment, running in the third party system. Intel SGX creates sequestered portions of the hardware's processor and memory known as "enclaves" making it impossible to view data or code inside the enclave. Software within the management core handles encryption, key management, and workflows.

In some embodiments, the system may be some hybrid between FIGS. 1A and 1B. For example, some datasets may be processed at local sequestered computing nodes, especially extremely large datasets, and others may be processed at third parties. Such systems provide flexibility based upon computational infrastructure, while still ensuring all data and algorithms remain sequestered and not visible except to their respective owners.

Figure 2:
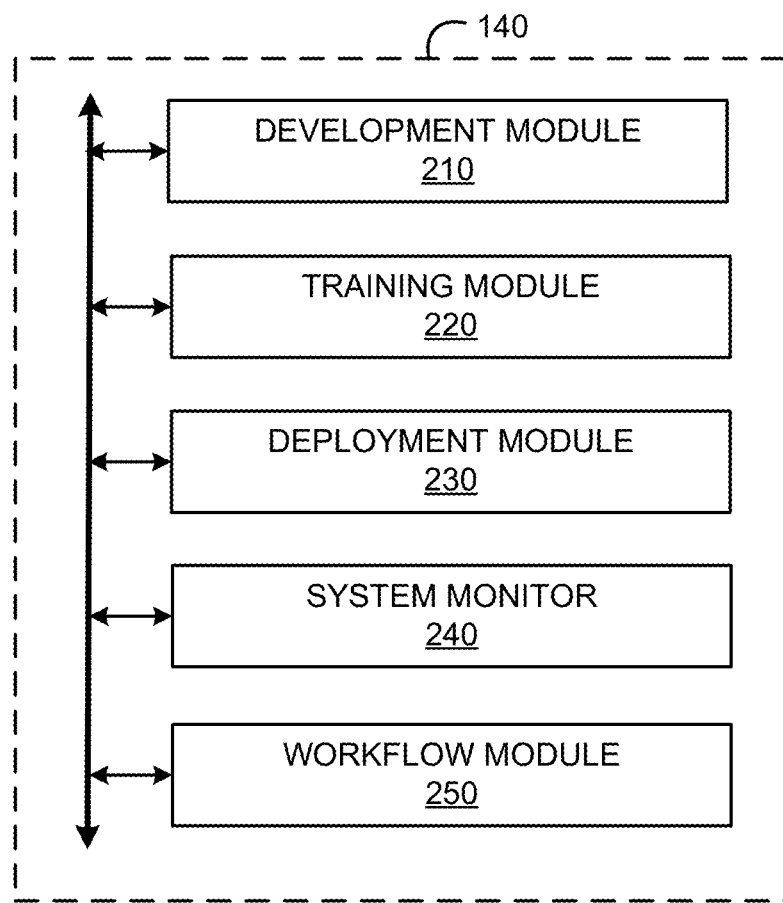
FIG. 2 is an example block diagram showing the core management system, in accordance with some embodiment.

Turning now to FIG. 2, greater detail is provided regarding the core management system 140. The core management system 140 may include a data science development module 210, a data harmonizer workflow creation module 250, a software deployment module 230, a federated master algorithm training module 220, a system monitoring module 240, and a data store comprising global join data 240.

The data science development module 210 may be configured to receive input data requirements from the one or more algorithm developers for the optimization and/or validation of the one or more models. The input data requirements define the objective for data curation, data transformation, and data harmonization workflows. The input data requirements also provide constraints for identifying data assets acceptable for use with the one or more models. The data harmonizer workflow creation module 250 may be configured to manage transformation, harmonization, and annotation protocol development and deployment. The software deployment module 230 may be configured along with the data science development module 210 and the data harmonizer workflow creation module 250 to assess data assets for use with one or more models. This process can be automated or can be an interactive search/query process. The software deployment module 230 may be further configured along with the data science development module 210 to integrate the models into a sequestered capsule computing framework, along with required libraries and resources.

In some embodiments, it is desired to develop a robust, superior algorithm/model that has learned from multiple disjoint private data sets (e.g., clinical and health data) collected by data hosts from sources (e.g., patients). The federated master algorithm training module may be configured to aggregate the learning from the disjoint data sets into a single master algorithm. In different embodiments, the algorithmic methodology for the federated training may be different. For example, sharing of model parameters, ensemble learning, parent-teacher learning on shared data and many other methods may be developed to allow for federated training. The privacy and security requirements, along with commercial considerations such as the determination of how much each data system might be paid for access to data, may determine which federated training methodology is used.

The system monitoring module 240 monitors activity in sequestered computing nodes. Monitored activity can range from operational tracking such as computing workload, error state, and connection status as examples to data science monitoring such as amount of data processed, algorithm convergence status, variations in data characteristics, data errors, algorithm/model performance metrics, and a host of additional metrics, as required by each use case and embodiment.

In some instances, it is desirable to augment private data sets with additional data located at the core management system (join data 150). For example, geolocation air quality data could be joined with geolocation data of patients to ascertain environmental exposures. In certain instances, join data may be transmitted to sequestered computing nodes to be joined with their proprietary datasets during data harmonization or computation.

The sequestered computing nodes may include a harmonizer workflow module, harmonized data, a runtime server, a system monitoring module, and a data management module (not shown). The transformation, harmonization, and annotation workflows managed by the data harmonizer workflow creation module may be deployed by and performed in the environment by harmonizer workflow module using transformations and harmonized data. In some instances, the join data may be transmitted to the harmonizer workflow module to be joined with data during data harmonization. The runtime server may be configured to run the private data sets through the algorithm/model.

The system monitoring module monitors activity in the sequestered computing node. Monitored activity may include operational tracking such as algorithm/model intake, workflow configuration, and data host onboarding, as required by each use case and embodiment. The data management module may be configured to import data assets such as private data sets while maintaining the data assets within the pre-exiting infrastructure of the data stewards.

Figure 3:
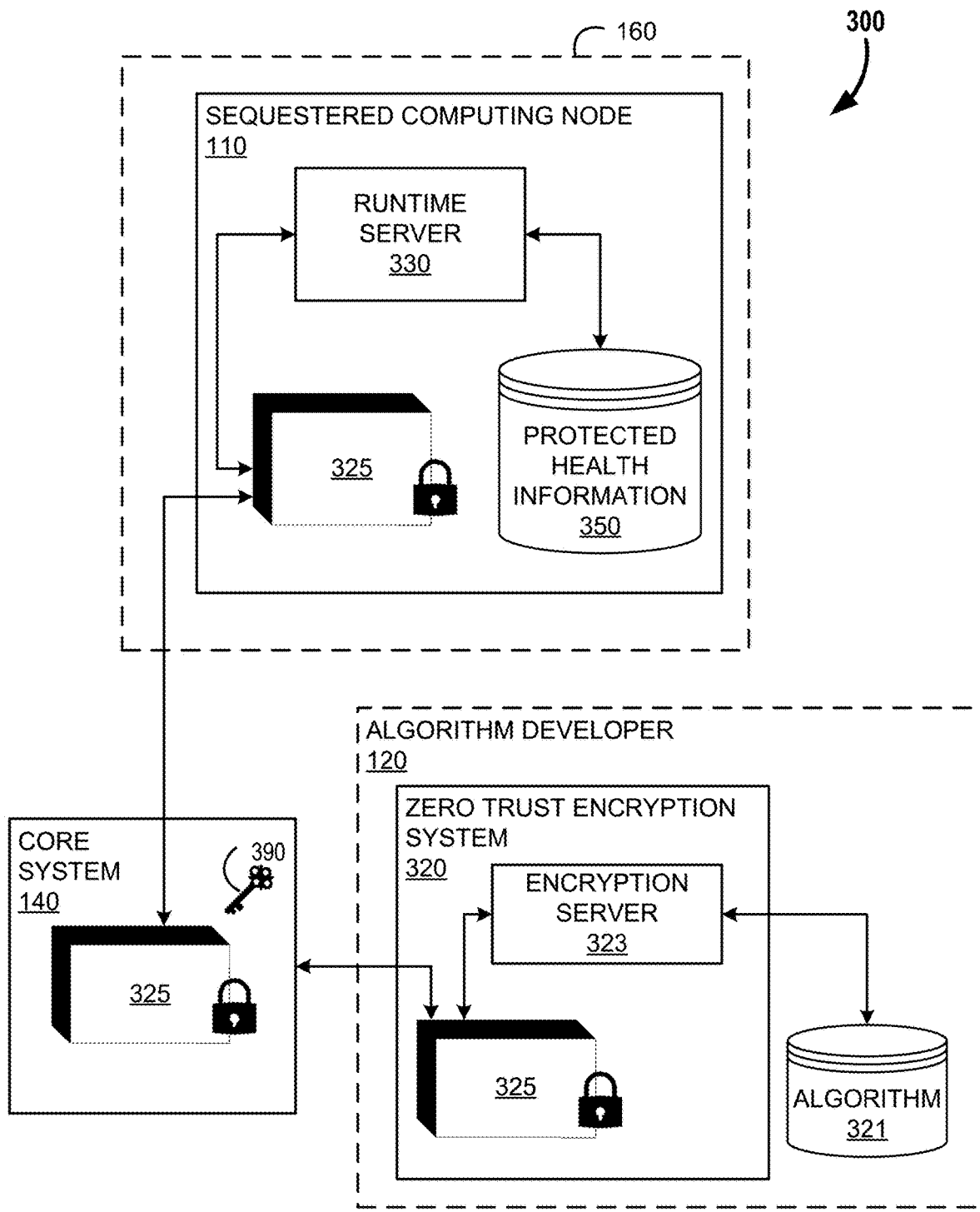
FIG. 3 is an example block diagram showing a first model for the zero-trust data flow, in accordance with some embodiment.

Turning now to FIG. 3, a first model of the flow of algorithms and data are provided, generally at 300. The Zero-Trust Encryption System 320 manages the encryption, by an encryption server 323, of all the algorithm developer's 120 software assets 321 in such a way as to prevent exposure of intellectual property (including source or object code) to any outside party, including the entity running the core management system 140 and any affiliates, during storage, transmission and runtime of said encrypted algorithms 325. In this embodiment, the algorithm developer is responsible for encrypting the entire payload 325 of the software using its own encryption keys. Decryption is only ever allowed at runtime in a sequestered capsule computing environment 110.

The core management system 140 receives the encrypted computing assets (algorithms) 325 from the algorithm developer 120. Decryption keys to these assets are not made available to the core management system 140 so that sensitive materials are never visible to it. The core management system 140 distributes these assets 325 to a multitude of data steward nodes 160 where they can be processed further, in combination with private datasets, such as protected health information (PHI) 350.

Each Data Steward Node 160 maintains a sequestered computing node 110 that is responsible for allowing the algorithm developer's encrypted software assets 325 to compute on a local private dataset 350 that is initially encrypted. Within data steward node 160, one or more local private datasets (not illustrated) is harmonized, transformed, and/or annotated and then this dataset is encrypted by the data steward, into a local dataset 350, for use inside the sequestered computing node 110.

The sequestered computing node 110 receives the encrypted software assets 325 and encrypted data steward dataset(s) 350 and manages their decryption in a way that prevents visibility to any data or code at runtime at the runtime server 330. In different embodiments this can be performed using a variety of secure computing enclave technologies, including but not limited to hardware-based and software-based isolation.

In this present embodiment, the entire algorithm developer software asset payload 325 is encrypted in a way that it can only be decrypted in an approved sequestered computing enclave/node 110. This approach works for sequestered enclave technologies that do not require modification of source code or runtime environments in order to secure the computing space (e.g., software-based secure computing enclaves).

Figure 4:
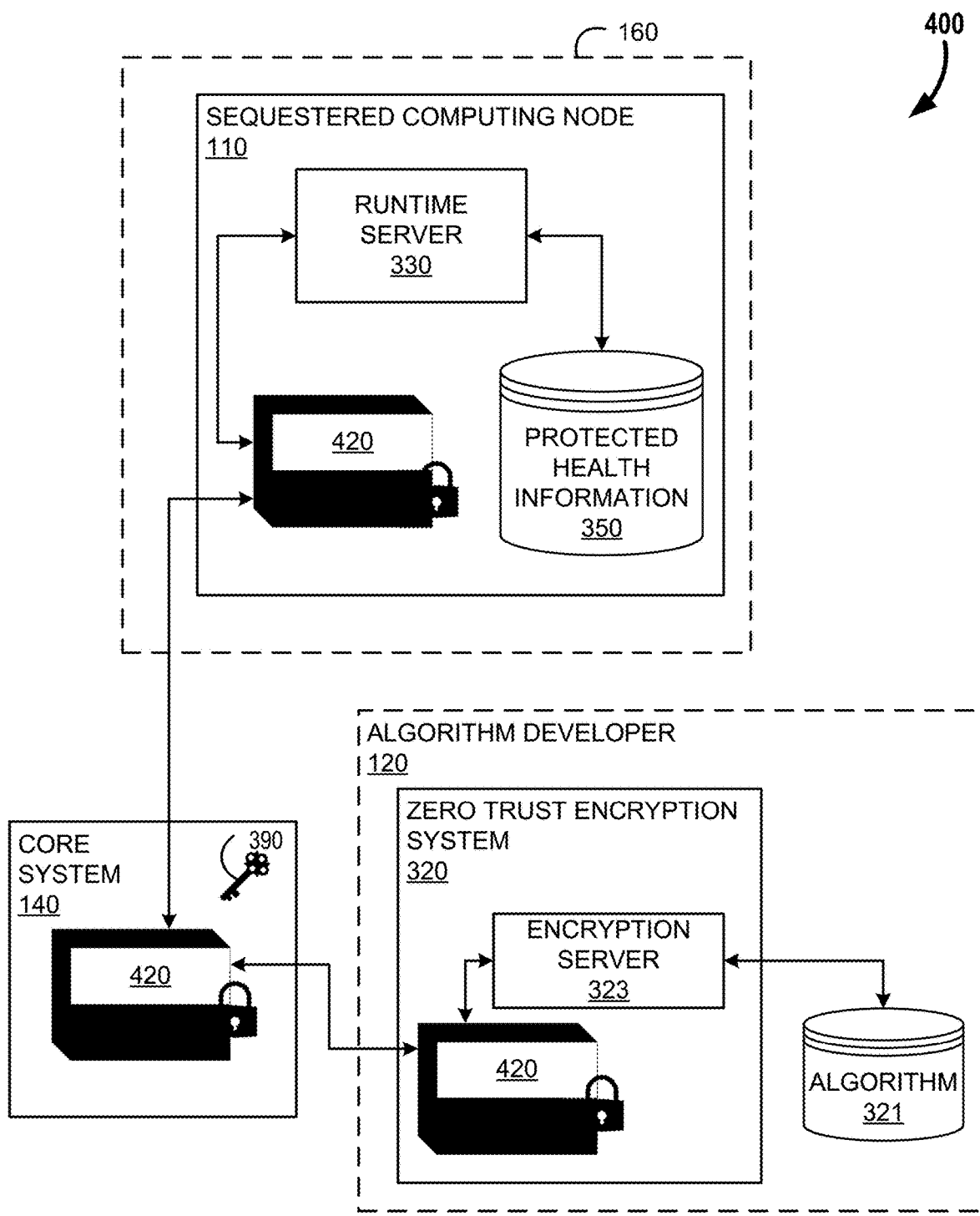
FIG. 4 is an example block diagram showing a second model for the zero-trust data flow, in accordance with some embodiment.

Turning to FIG. 4, the general environment is maintained, as seen generally at 400, however in this embodiment, the encryption server 323 takes the algorithm asset 321, and only encrypts a specific sensitive layer 425 (generally comprising the algorithm weights), while leaving remaining non-sensitive algorithm elements 420 (such as the container and base model minus weights) unencrypted. This embodiment has the advantage of allowing the unencrypted portion 420 of the payload to be transformed, or otherwise altered, by either the core management system 140, or by the data steward 160. An example would be the conversion of specific library dependencies from the original operating system to Enclave OS, a special operating system that runs code in an Intel SGX sequestered computing enclave.

Figure 5:
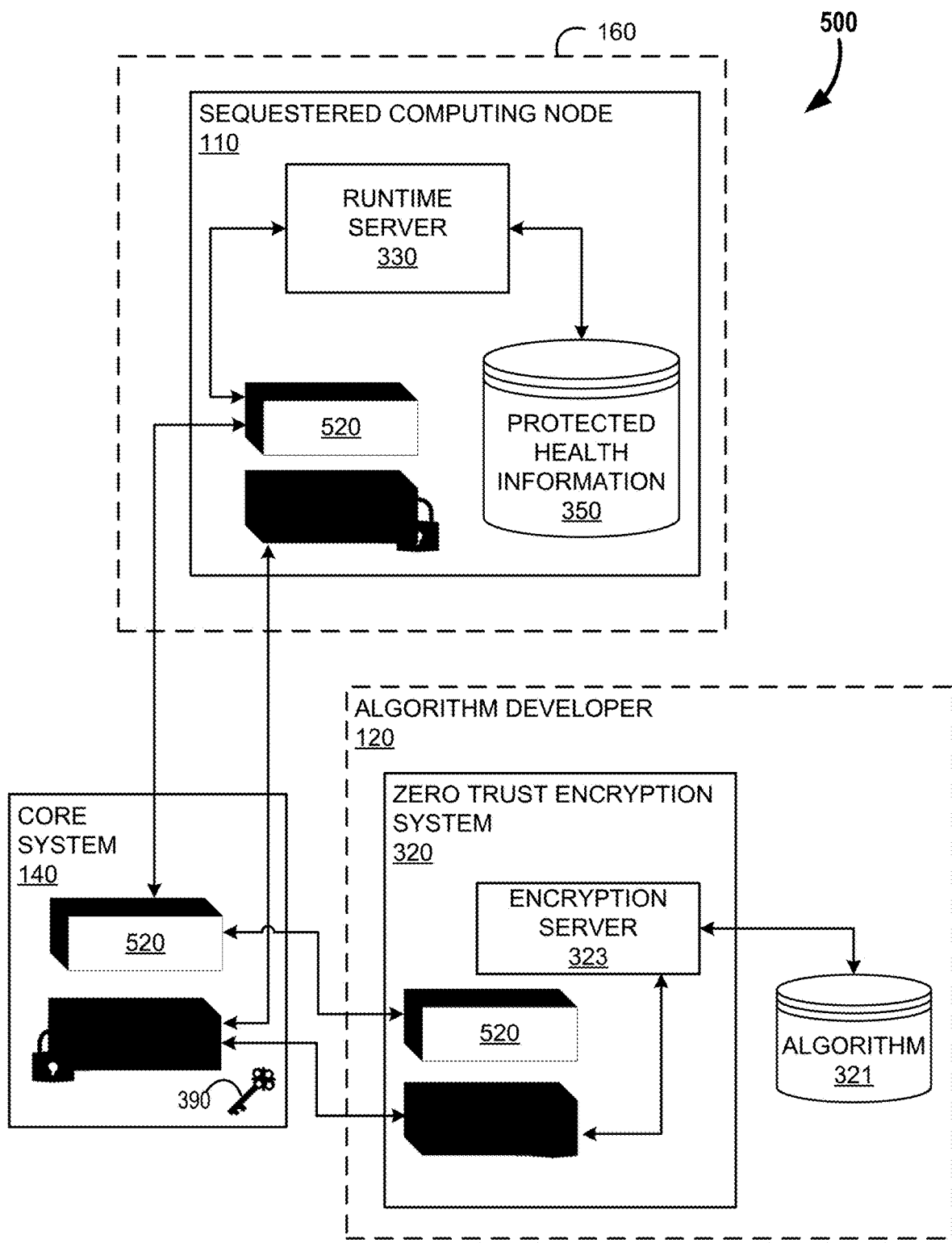
FIG. 5 is an example block diagram showing a third model for the zero-trust data flow, in accordance with some embodiment.

In a similar manner, FIG. 5 provides an example embodiment of a system whereby the sensitive and non-sensitive portions of the developer assets 321 are treated differently, seen generally at 500. In this example, however, rather than only encrypting a specific layer of the ultimate payload, the assets are separated into two portions: the sensitive elements 525 and the non-sensitive elements 520. The non-sensitive elements 520, are then transferred in the clear, while the sensitive elements 525 are encrypted before leaving the zero trust encryption system 320. As with the embodiment found in FIG. 4, this methodology of splitting the payload into two entirely separate elements allows the unencrypted non-sensitive payload 520 to be modified.

Figure 6:
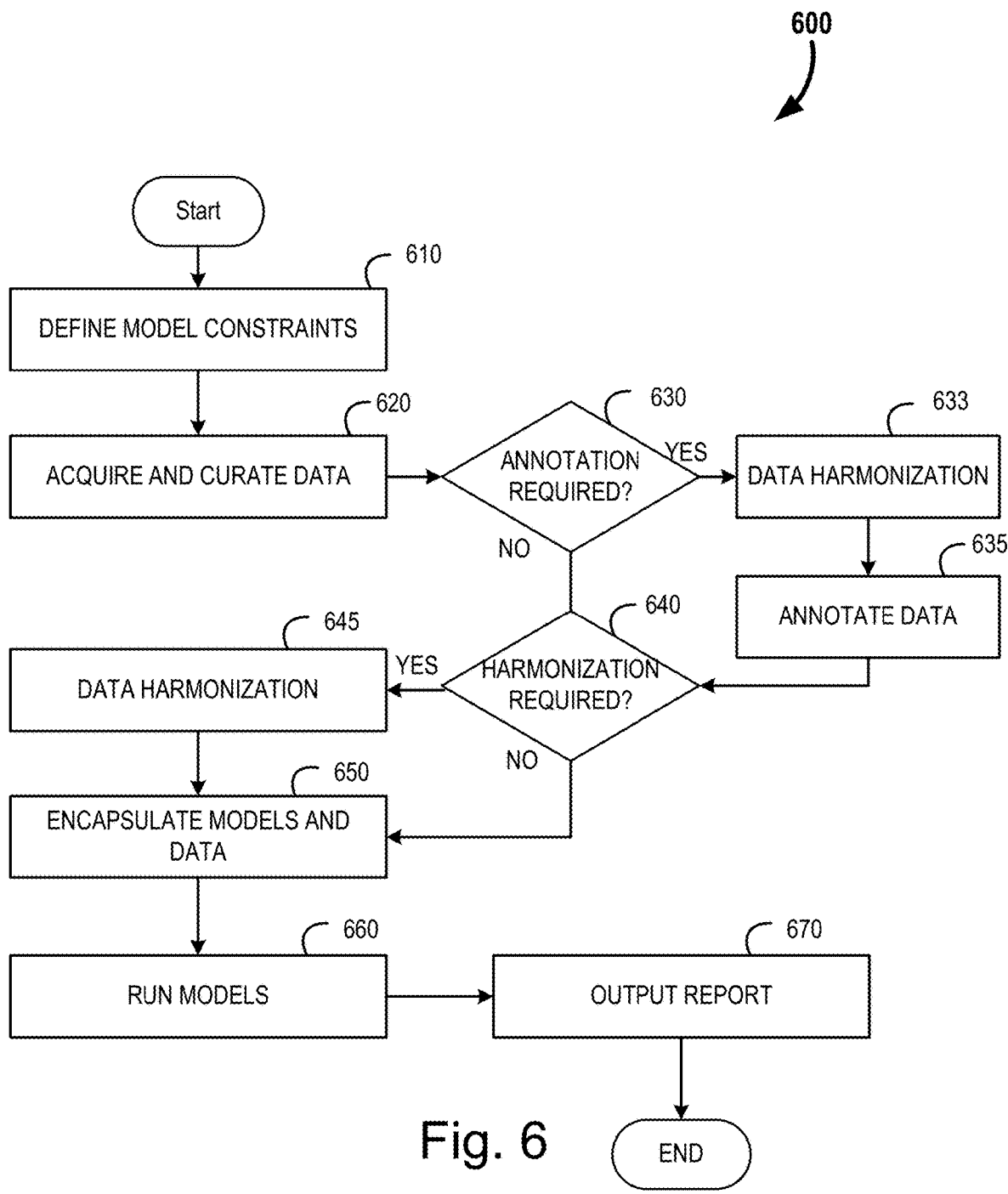
FIG. 6 is a flowchart for an example process for the operation of the zero-trust data processing system, in accordance with some embodiment.

Turning to FIG. 6, one embodiment of the process for deployment and running of algorithms within the sequestered computing nodes is illustrated, at 600. Initially the algorithm developer provides the algorithm to the system. The at least one algorithm/model is generated by the algorithm developer using their own development environment, tools, and seed data sets (e.g., training/testing data sets). In some embodiments, the algorithms may be trained on external datasets instead, as will be discussed further below. The algorithm developer provides constraints (at 610) for the optimization and/or validation of the algorithm(s). Constraints may include any of the following: (i) training constraints, (ii) data preparation constraints, and (iii) validation constraints. These constraints define objectives for the optimization and/or validation of the algorithm(s) including data preparation (e.g., data curation, data transformation, data harmonization, and data annotation), model training, model validation, and reporting.

In some embodiments, the training constraints may include, but are not limited to, at least one of the following: hyperparameters, regularization criteria, convergence criteria, algorithm termination criteria, training/validation/test data splits defined for use in algorithm(s), and training/testing report requirements. A model hyper parameter is a configuration that is external to the model, and which value cannot be estimated from data. The hyperparameters are settings that may be tuned or optimized to control the behavior of a ML or AI algorithm and help estimate or learn model parameters.

Regularization constrains the coefficient estimates towards zero. This discourages the learning of a more complex model in order to avoid the risk of overfitting. Regularization, significantly reduces the variance of the model, without a substantial increase in its bias. The convergence criterion is used to verify the convergence of a sequence (e.g., the convergence of one or more weights after a number of iterations). The algorithm termination criteria define parameters to determine whether a model has achieved sufficient training. Because algorithm training is an iterative optimization process, the training algorithm may perform the following steps multiple times. In general, termination criteria may include performance objectives for the algorithm, typically defined as a minimum amount of performance improvement per iteration or set of iterations.

The training/testing report may include criteria that the algorithm developer has an interest in observing from the training, optimization, and/or testing of the one or more models. In some instances, the constraints for the metrics and criteria are selected to illustrate the performance of the models. For example, the metrics and criteria such as mean percentage error may provide information on bias, variance, and other errors that may occur when finalizing a model such as vanishing or exploding gradients. Bias is an error in the learning algorithm. When there is high bias, the learning algorithm is unable to learn relevant details in the data. Variance is an error in the learning algorithm, when the learning algorithm tries to over-learn from the dataset or tries to fit the training data as closely as possible. Further, common error metrics such as mean percentage error and R2 score are not always indicative of accuracy of a model, and thus the algorithm developer may want to define additional metrics and criteria for a more in depth look at accuracy of the model.

Figure 7A:
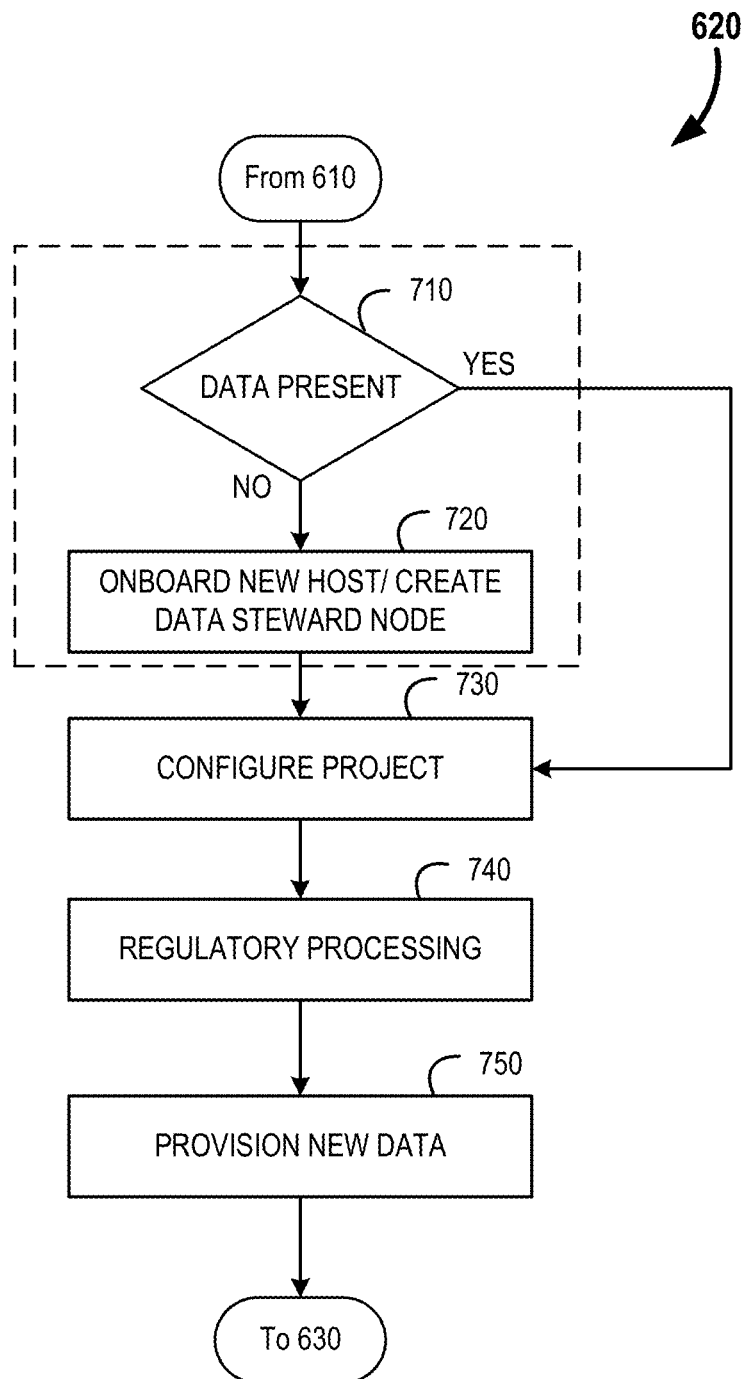
FIG. 7A a flowchart for an example process of acquiring and curating data, in accordance with some embodiment.

Next, data assets that will be subjected to the algorithm(s) are identified, acquired, and curated (at 620). FIG. 7A provides greater detail of this acquisition and curation of the data. Often, the data may include healthcare related data (PHI). Initially, there is a query if data is present (at 710). The identification process may be performed automatically by the platform running the queries for data assets (e.g., running queries on the provisioned data stores using the data indices) using the input data requirements as the search terms and/or filters. Alternatively, this process may be performed using an interactive process, for example, the algorithm developer may provide search terms and/or filters to the platform. The platform may formulate questions to obtain additional information, the algorithm developer may provide the additional information, and the platform may run queries for the data assets (e.g., running queries on databases of the one or more data hosts or web crawling to identify data hosts that may have data assets) using the search terms, filters, and/or additional information. In either instance, the identifying is performed using differential privacy for sharing information within the data assets by describing patterns of groups within the data assets while withholding private information about individuals in the data assets.

Figure 7B:
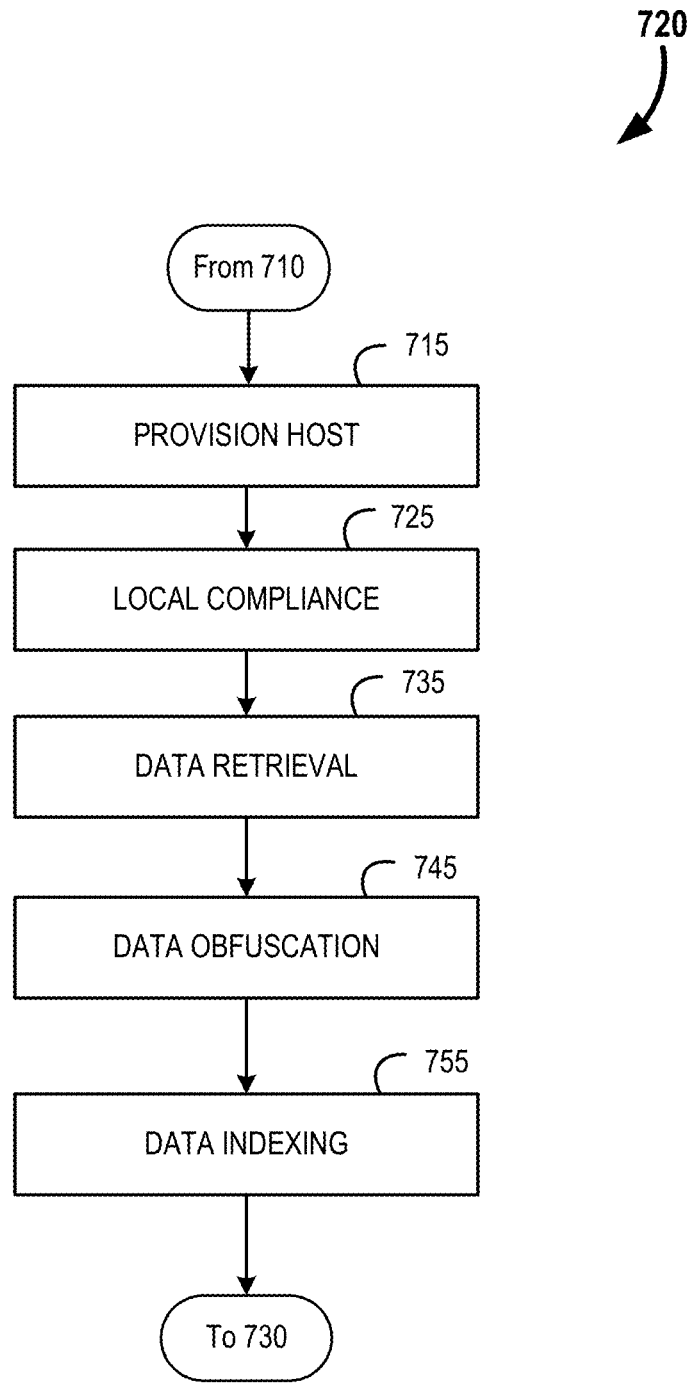
FIG. 7B a flowchart for an example process of onboarding a new host data steward, in accordance with some embodiment.

If the assets are not available, the process generates a new data steward node (at 720). The data query and onboarding activity (surrounded by a dotted line) is illustrated in this process flow of acquiring the data; however, it should be realized that these steps may be performed anytime prior to model and data encapsulation (step 650 in FIG. 6). Onboarding/creation of a new data steward node is shown in greater detail in relation to FIG. 7B. In this example process a data host compute and storage infrastructure (e.g., a sequestered computing node as described with respect to FIGS. 1A-5) is provisioned (at 715) within the infrastructure of the data steward. In some instances, the provisioning includes deployment of encapsulated algorithms in the infrastructure, deployment of a physical computing device with appropriately provisioned hardware and software in the infrastructure, deployment of storage (physical data stores or cloud-based storage), or deployment on public or private cloud infrastructure accessible via the infrastructure, etc.

Next, governance and compliance requirements are performed (at 725). In some instances, the governance and compliance requirements includes getting clearance from an institutional review board, and/or review and approval of compliance of any project being performed by the platform and/or the platform itself under governing law such as the Health Insurance Portability and Accountability Act (HIPAA). Subsequently, the data assets that the data steward desires to be made available for optimization and/or validation of algorithm(s) are retrieved (at 735). In some instances, the data assets may be transferred from existing storage locations and formats to provisioned storage (physical data stores or cloud-based storage) for use by the sequestered computing node (curated into one or more data stores). The data assets may then be obfuscated (at 745). Data obfuscation is a process that includes data encryption or tokenization, as discussed in much greater detail below. Lastly, the data assets may be indexed (at 755). Data indexing allows queries to retrieve data from a database in an efficient manner. The indexes may be related to specific tables and may be comprised of one or more keys or values to be looked up in the index (e.g., the keys may be based on a data table's columns or rows).

Returning to FIG. 7A, after the creation of the new data steward, the project may be configured (at 730). In some instances, the data steward computer and storage infrastructure is configured to handle a new project with the identified data assets. In some instances, the configuration is performed similarly to the process described of FIG. 7B. Next, regulatory approvals (e.g., IRB and other data governance processes) are completed and documented (at 740). Lastly, the new data is provisioned (at 750). In some instances, the data storage provisioning includes identification and provisioning of a new logical data storage location, along with creation of an appropriate data storage and query structure.

Returning now to FIG. 6, after the data is acquired and configured, a query is performed if there is a need for data annotation (at 630). If so, the data is initially harmonized (at 633) and then annotated (at 635). Data harmonization is the process of collecting data sets of differing file formats, naming conventions, and columns, and transforming it into a cohesive data set. The annotation is performed by the data steward in the sequestered computing node. A key principle to the transformation and annotation processes is that the platform facilitates a variety of processes to apply and refine data cleaning and transformation algorithms, while preserving the privacy of the data assets, all without requiring data to be moved outside of the technical purview of the data steward.

Figure 8:
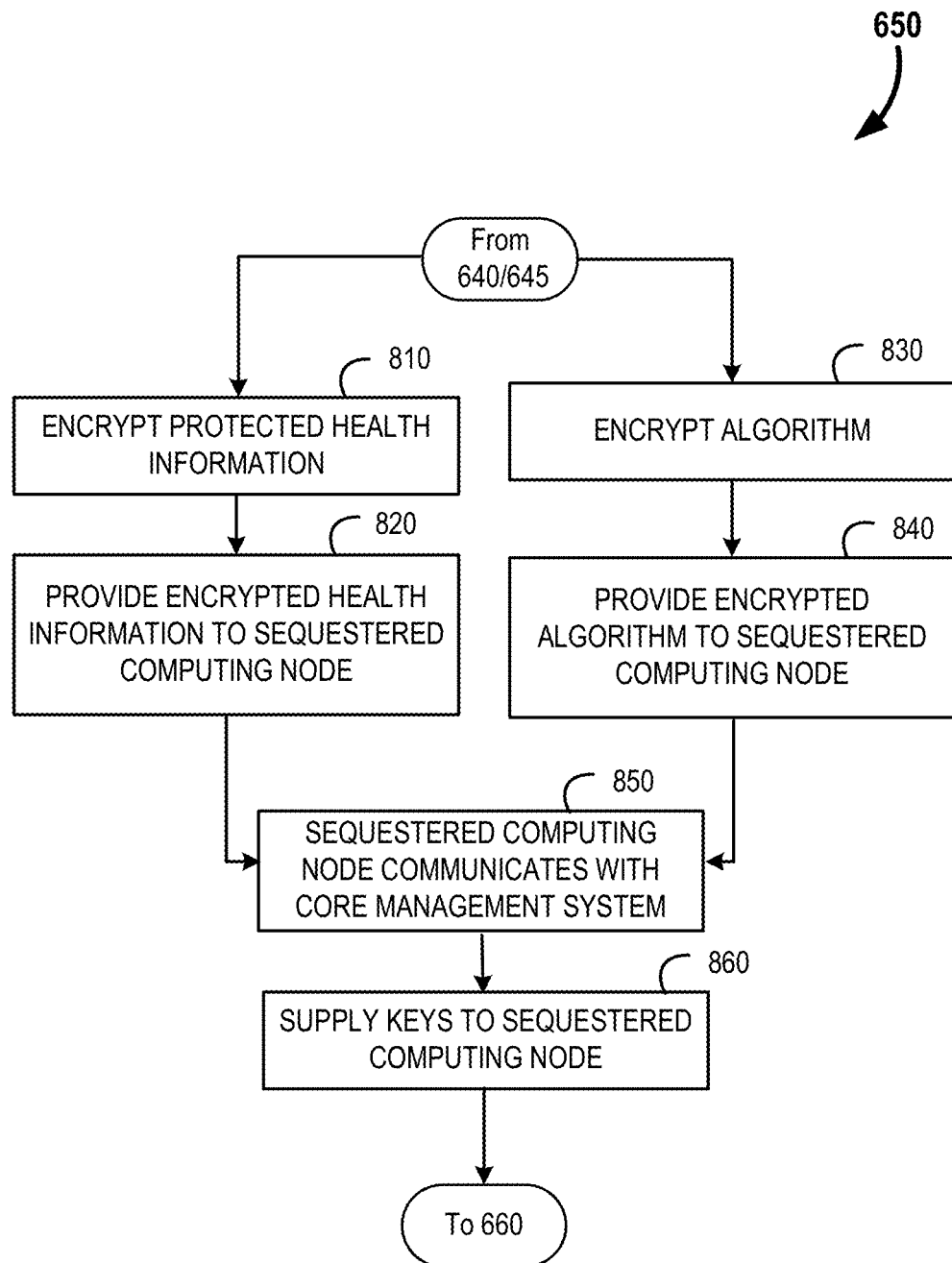
FIG. 8 is a flowchart for an example process of encapsulating the algorithm and data, in accordance with some embodiment.

After annotation, or if annotation was not required, another query determines if additional data harmonization is needed (at 640). If so, then there is another harmonization step (at 645) that occurs in a manner similar to that disclosed above. After harmonization, or if harmonization isn't needed, the models and data are encapsulated (at 650). Data and model encapsulation is described in greater detail in relation to FIG. 8. In the encapsulation process the protected data, and the algorithm are each encrypted (at 810 and 830 respectively). In some embodiments, the data is encrypted either using traditional encryption algorithms (e.g., RSA) or homomorphic encryption.

Next the encrypted data and encrypted algorithm are provided to the sequestered computing node (at 820 and 840 respectively). There processes of encryption and providing the encrypted payloads to the sequestered computing nodes may be performed asynchronously, or in parallel. Subsequently, the sequestered computing node may phone home to the core management node (at 850) requesting the keys needed. These keys are then also supplied to the sequestered computing node (at 860), thereby allowing the decryption of the assets.

Returning again to FIG. 6, once the assets are all within the sequestered computing node, they may be decrypted and the algorithm may run against the dataset (at 660). The results from such runtime may be outputted as a report (at 670) for downstream consumption.

Figure 9:
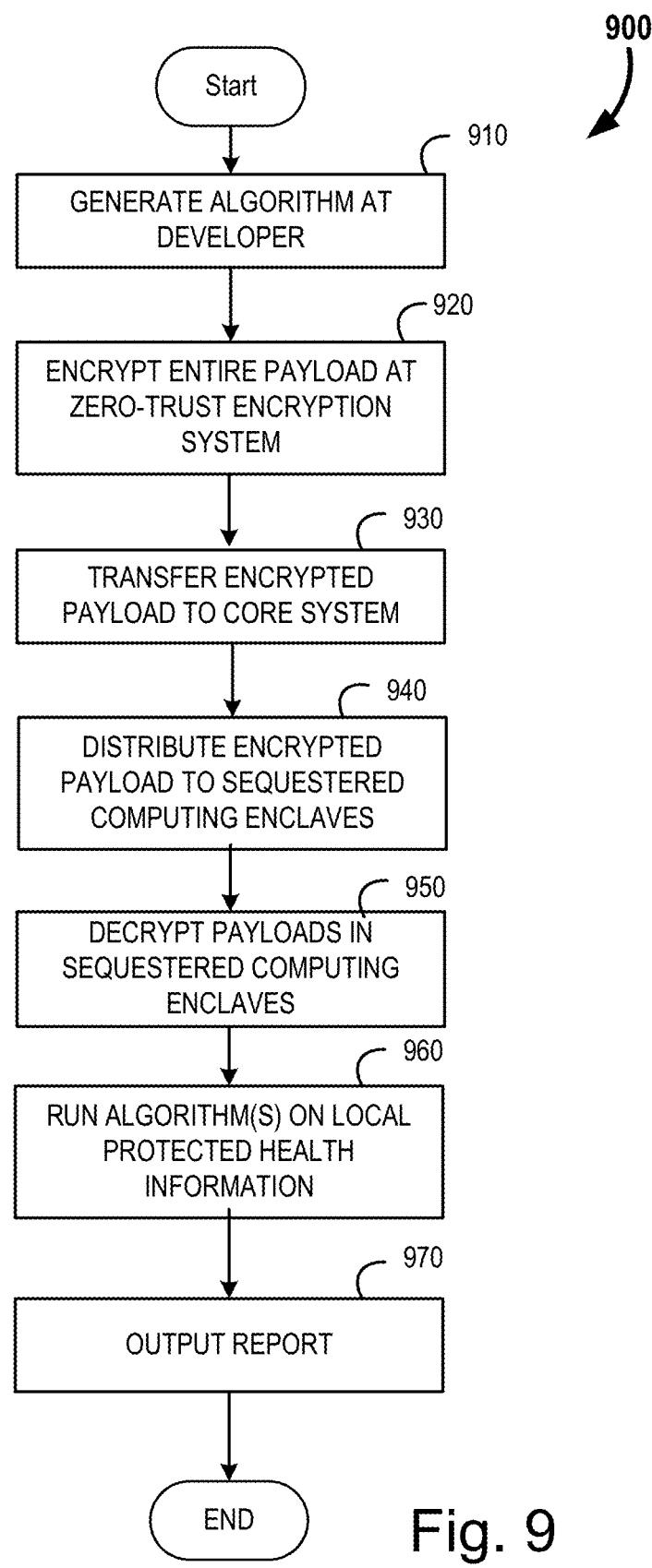
FIG. 9 is a flowchart for an example process of a first model of algorithm encryption and handling, in accordance with some embodiment.

Turning now to FIG. 9, a first embodiment of the system for zero-trust processing of the data assets by the algorithm is provided, at 900. In this example process, the algorithm is initially generated by the algorithm developer (at 910) in a manner similar to that described previously. The entire algorithm, including its container, is then encrypted (at 920), using a public key, by the encryption server within the zero-trust system of the algorithm developer's infrastructure. The entire encrypted payload is provided to the core management system (at 930). The core management system then distributes the encrypted payload to the sequestered computing enclaves (at 940).

Likewise, the data steward collects the data assets desired for processing by the algorithm. This data is also provided to the sequestered computing node. In some embodiments, this data may also be encrypted. The sequestered computing node then contacts the core management system for the keys. The system relies upon public-private key methodologies for the decryption of the algorithm, and possibly the data (at 950).

After decryption within the sequestered computing node, the algorithm(s) are run (at 960) against the protected health information (or other sensitive information based upon the given use case). The results are then output (at 970) to the appropriate downstream audience (generally the data steward, but may include public health agencies or other interested parties).

Figure 10:
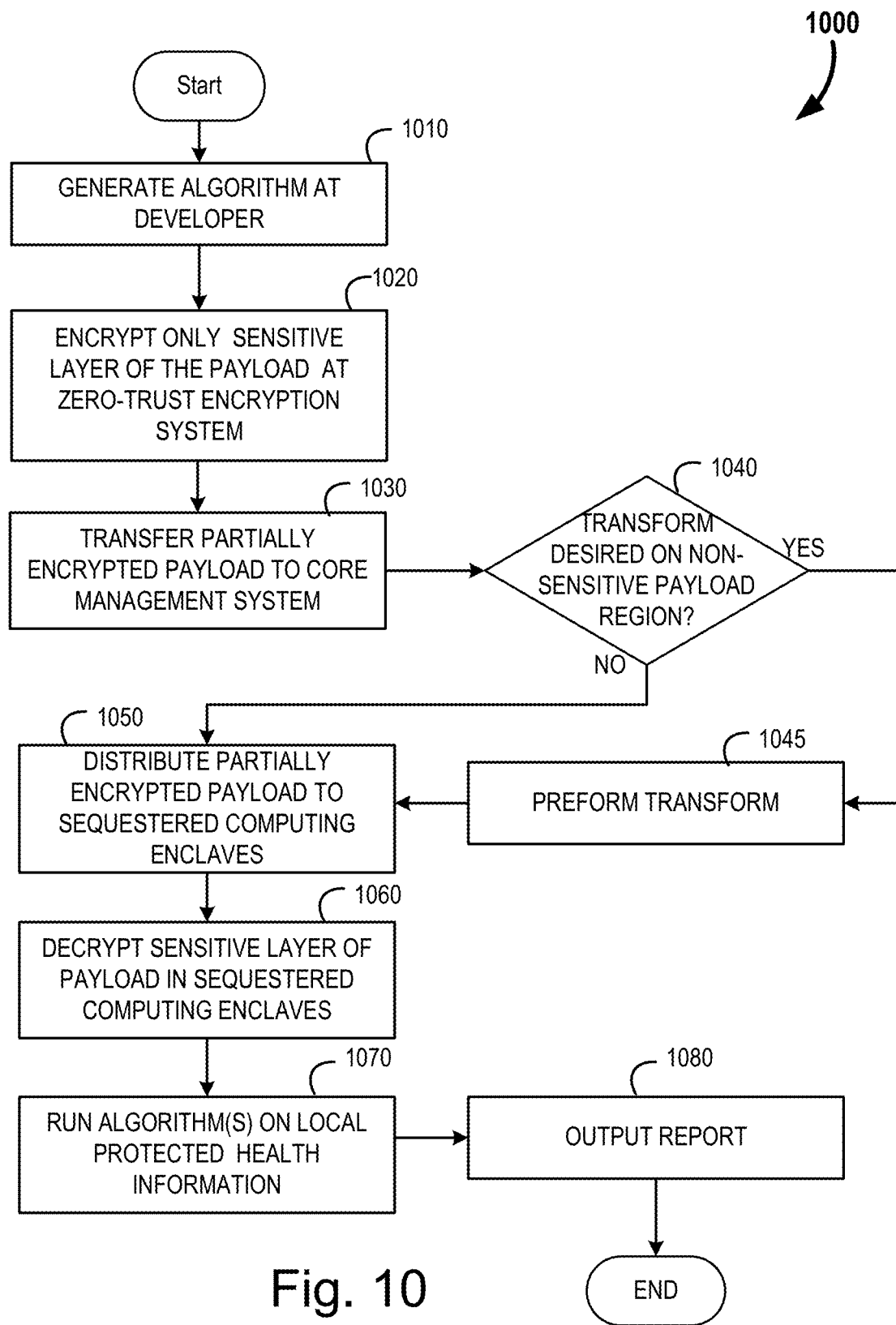
FIG. 10 is a flowchart for an example process of a second model of algorithm encryption and handling, in accordance with some embodiments.

FIG. 10, on the other hand, provides another methodology of zero-trust computation that has the advantage of allowing some transformation of the algorithm data by either the core management system or the data steward themselves, shown generally at 1000. As with the prior embodiment, the algorithm is initially generated by the algorithm developer (at 1010). However, at this point the two methodologies diverge. Rather than encrypt the entire algorithm payload, it differentiates between the sensitive portions of the algorithm (generally the algorithm weights), and non-sensitive portions of the algorithm (including the container, for example). The process then encrypts only layers of the payload that have been flagged as sensitive (at 1020).

The partially encrypted payload is then transferred to the core management system (at 1030). At this stage a determination is made whether a modification is desired to the non-sensitive, non-encrypted portion of the payload (at 1040). If a modification is desired, then it may be performed in a similar manner as discussed previously (at 1045).

If no modification is desired, or after the modification is performed, the payload may be transferred (at 1050) to the sequestered computing node located within the data steward infrastructure (or a third party). Although not illustrated, there is again an opportunity at this stage to modify any non-encrypted portions of the payload when the algorithm payload is in the data steward's possession.

Next, the keys unique to the sequestered computing node are employed to decrypt the sensitive layer of the payload (at 1060), and the algorithms are run against the locally available protected health information (at 1070). In the use case where a third party is hosting the sequestered computing node, the protected health information may be encrypted at the data steward before being transferred to the sequestered computing node at said third party. Regardless of sequestered computing node location, after runtime, the resulting report is outputted to the data steward and/or other interested party (at 1080).

Figure 11:
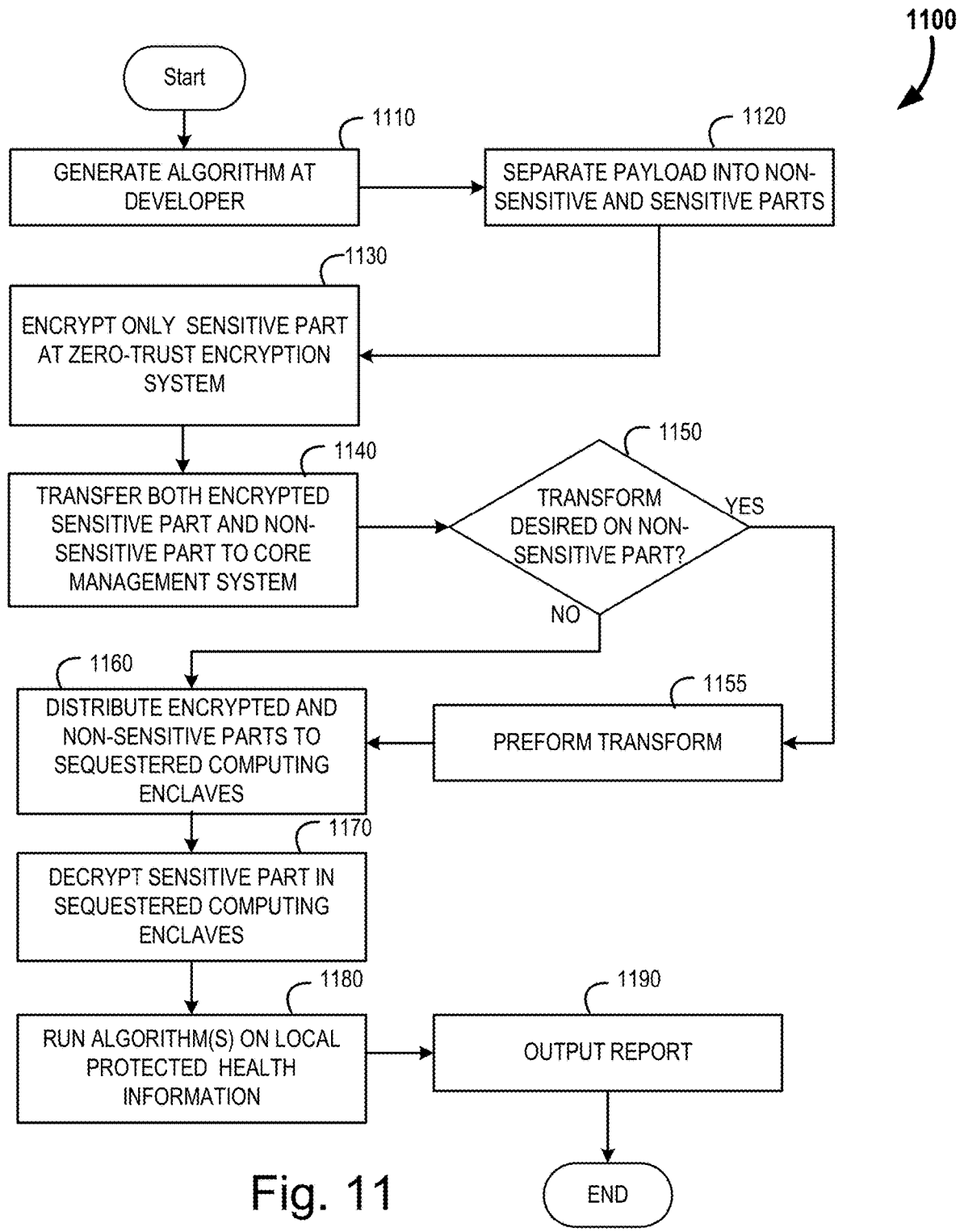
FIG. 11 is a flowchart for an example process of a third model of algorithm encryption and handling, in accordance with some embodiments.

FIG. 11, as seen at 1100, is similar to the prior two figures in many regards. The algorithm is similarly generated at the algorithm developer (at 1110); however, rather than being subject to an encryption step immediately, the algorithm payload may be logically separated into a sensitive portion and a non-sensitive portion (at 1120). To ensure that the algorithm runs properly when it is ultimately decrypted in the (sequestered) sequestered computing enclave, instructions about the order in which computation steps are carried out may be added to the unencrypted portion of the payload.

Subsequently, the sensitive portion is encrypted at the zero-trust encryption system (at 1130), leaving the non-sensitive portion in the clear. Both the encrypted portion and the non-encrypted portion of the payload are transferred to the core management system (at 1140). This transfer may be performed as a single payload, or may be done asynchronously. Again, there is an opportunity at the core management system to perform a modification of the non-sensitive portion of the payload. A query is made if such a modification is desired (at 1150), and if so it is performed (at 1155). Transformations may be similar to those detailed above.

Subsequently, the payload is provided to the sequestered computing node(s) by the core management system (at 1160). Again, as the payload enters the data steward node(s), it is possible to perform modifications to the non-encrypted portion(s). Once in the sequestered computing node, the sensitive portion is decrypted (at 1170), the entire algorithm payload is run (at 1180) against the data that has been provided to the sequestered computing node (either locally or supplied as an encrypted data package). Lastly, the resulting report is outputted to the relevant entities (at 1190).

Any of the above modalities of operation provide the instant zero-trust architecture with the ability to process a data source with an algorithm without the ability for the algorithm developer to have access to the data being processed, the data steward being unable to view the algorithm being used, or the core management system from having access to either the data or the algorithm. This uniquely provides each party the peace of mind that their respective valuable assets are not at risk, and facilitates the ability to easily, and securely, process datasets.

Figure 12:
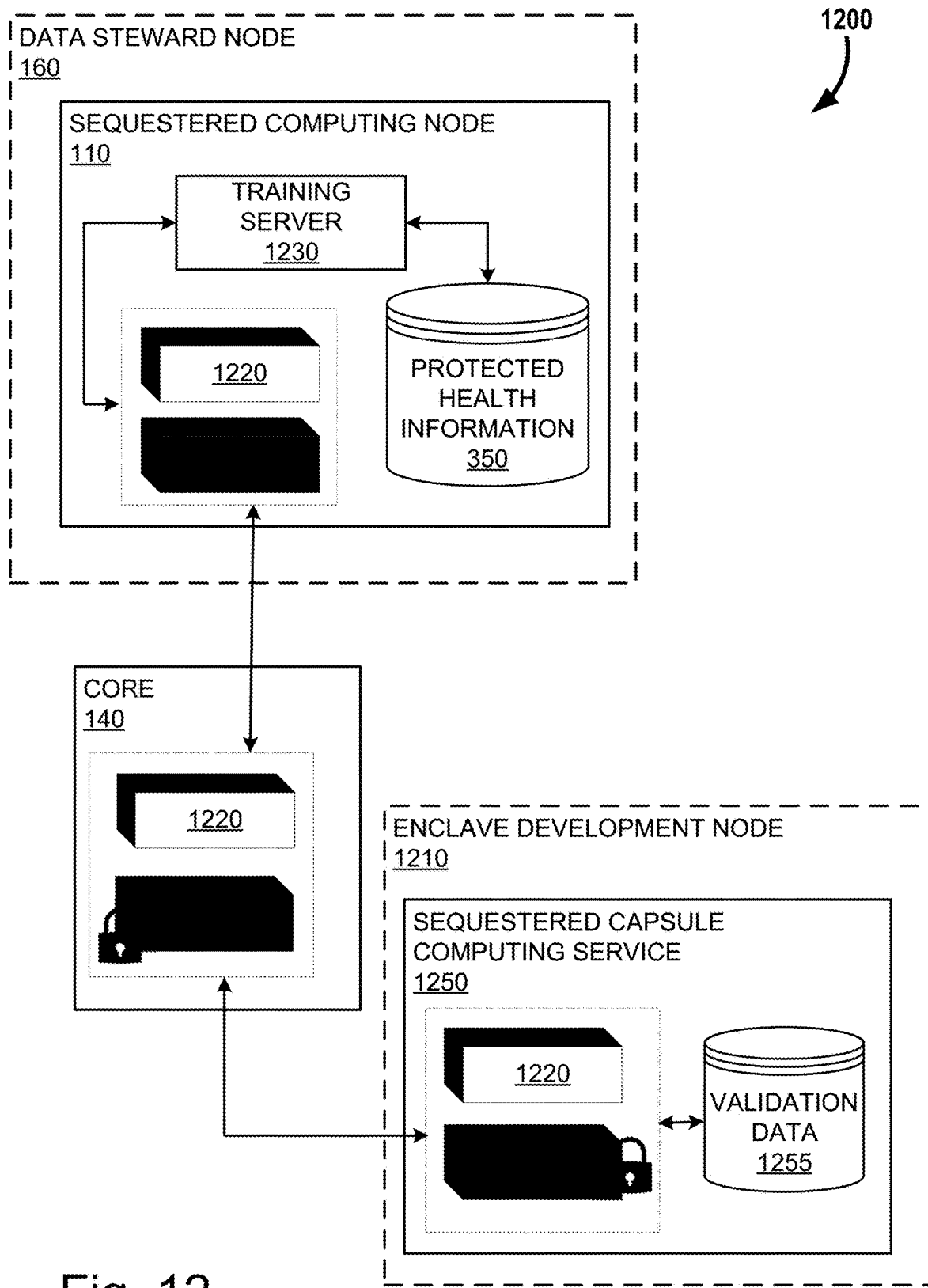
FIG. 12 is an example block diagram showing the training of the model within a zero-trust environment, in accordance with some embodiments.

Turning now to FIG. 12, a system for zero-trust training of algorithms is presented, generally at 1200. Traditionally, algorithm developers require training data to develop and refine their algorithms. Such data is generally not readily available to the algorithm developer due to the nature of how such data is collected, and due to regulatory hurdles. As such, the algorithm developers often need to rely upon other parties (data stewards) to train their algorithms. As with running an algorithm, training the algorithm introduces the potential to expose the algorithm and/or the datasets being used to train it.

In this example system, the nascent algorithm is provided to the sequestered computing node 110 in the data steward node 160. This new, untrained algorithm may be prepared by the algorithm developer (not shown) and provided in the clear to the sequestered computing node 110 as it does not yet contain any sensitive data. The sequestered computing node leverages the locally available protected health information 350, using a training server 1230, to train the algorithm. This generates a sensitive portion of the algorithm 1225 (generally the weights and coefficients of the algorithm), and a non-sensitive portion of the algorithm 1220. As the training is performed within the sequestered computing node 110, the data steward 160 does not have access to the algorithm that is being trained. Once the algorithm is trained, the sensitive portion 1225 of the algorithm is encrypted prior to being released from the sequestered computing enclave 110. This partially encrypted payload is then transferred to the data management core 140, and distributed to a sequestered capsule computing service 1250, operating within an enclave development node 1210. The enclave development node is generally hosted by one or more data stewards.

The sequestered capsule computing node 1250 operates in a similar manner as the sequestered computing node 110 in that once it is "locked" there is no visibility into the inner workings of the sequestered capsule computing node 1250. As such, once the algorithm payload is received, the sequestered capsule computing node 1250 may decrypt the sensitive portion of the algorithm 1225 using a public-private key methodology. The sequestered capsule computing node 1250 also has access to validation data 1255. The algorithm is run against the validation data, and the output is compared against a set of expected results. If the results substantially match, it indicates that the algorithm is properly trained, if the results do not match, then additional training may be required.

Figure 13:
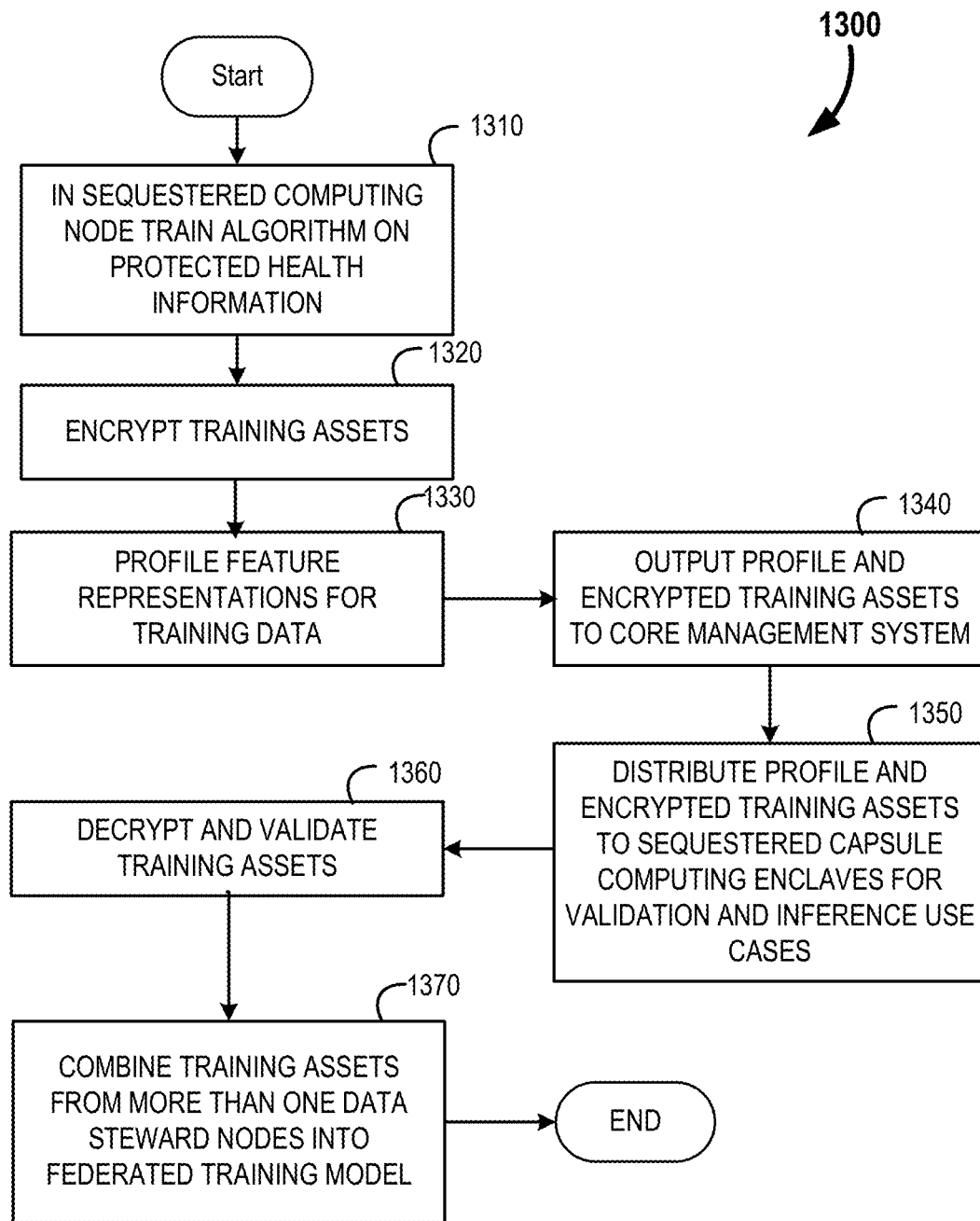
FIG. 13 is a flowchart for an example process of training of the model within a zero-trust environment, in accordance with some embodiments.

FIG. 13 provides the process flow, at 1300, for this training methodology. In the sequestered computing node, the algorithm is initially trained (at 1310). The training assets (sensitive portions of the algorithm) are encrypted within the sequestered computing node (at 1320). Subsequently the feature representations for the training data are profiled (at 1330). One example of a profiling methodology would be to take the activations of the certain AI model layers for samples in both the training and test set, and see if another model can be trained to recognize which activations came from which dataset. These feature representations are non-sensitive, and are thus not encrypted. The profile and the encrypted data assets are then output to the core management system (at 1340) and are distributed to one or more sequestered capsule computing enclaves (at 1350). At the sequestered capsule computing node, the training assets are decrypted and validated (at 1360). After validation the training assets from more than one data steward node are combined into a single featured training model (at 1370). This is known as federated training.

Figure 14:
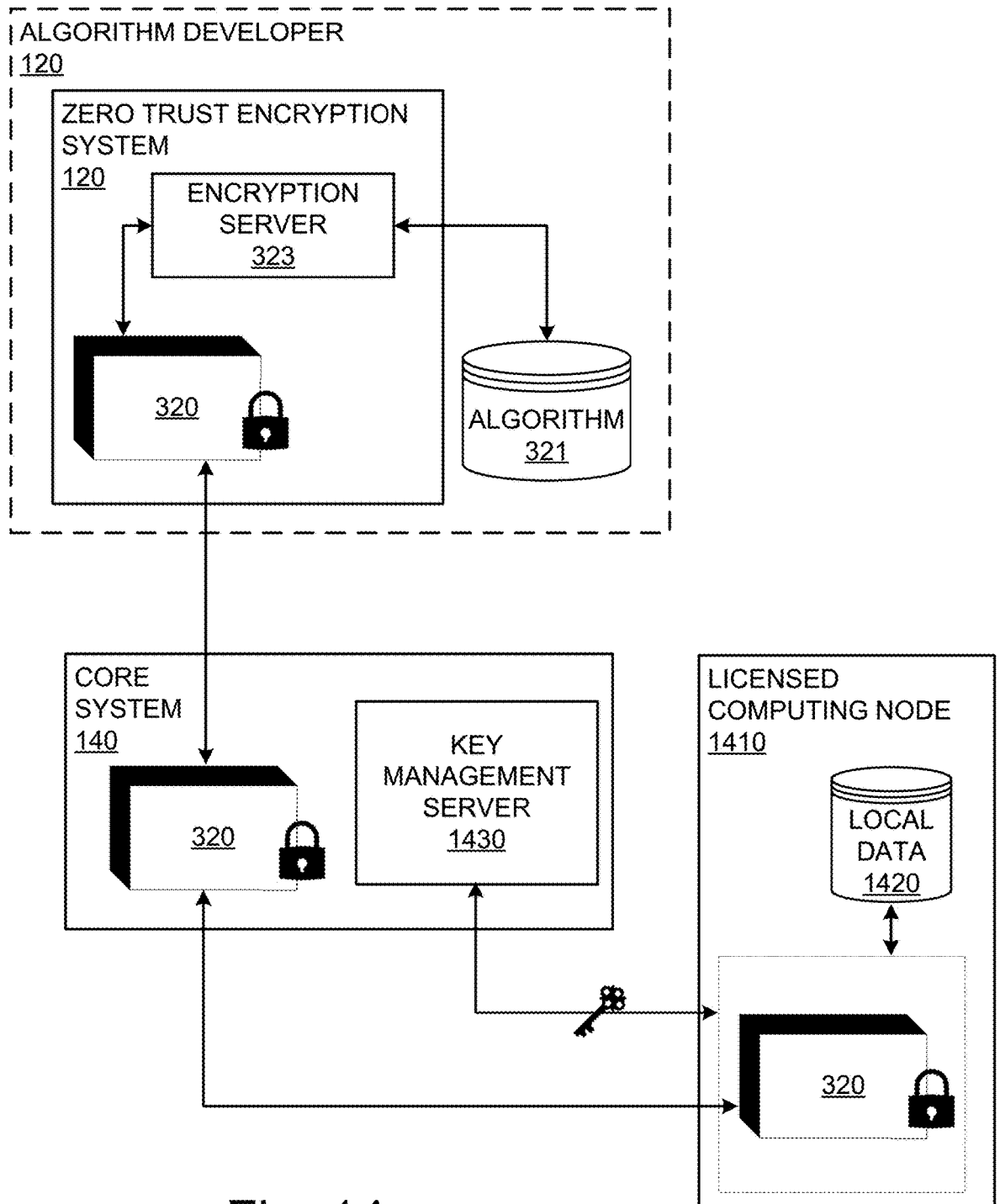
FIG. 14 is an example block diagram showing the key management for the running of an algorithm on a computing capsule within a semi-trust environment, in accordance with some embodiments.

Turning now to FIG. 14, a semi-trust computing architecture is provided, shown generally at 1300. Unlike a zero-trust system, in this example the core management system 140 operates not only as the distributer of the algorithm payloads, but also acts as a key management system. Thus, theoretically, the core management system 140 could decrypt the algorithm as it is provided. Thus, a certain level of trust is required between the algorithm developer 120 and the core management system 140. As such, it may be advantageous, in some particular embodiments, to have the core management system be hosted by the algorithm developer, or have the algorithm developer act as the key management system directly.

Regardless, in the instant embodiment, the algorithm developer's algorithm 321 is provided to the encryption server 323 to generate an encrypted payload 320. Here the entire payload is encrypted, however, as previously discussed, in alternate embodiments only a certain layer of the payload needs to be encrypted, or the payload may be separated into sensitive and non-sensitive portions and only specific portions are therefore encrypted. Regardless of method employed, the payload is provided to the core management system 140, which distributes the payload to licensed computing nodes 1410. These local nodes may include low processing powered devices that contain only local data sets. Examples of these local computing nodes may include devices such as EKG machines, dialysis machines, and other peripheral medical devices. Outside of the medical field, devices may include ATMs, smart home appliances, autonomous vehicles, or any other networked device that includes local datasets that need processing.

In addition to receiving the encrypted packet, the core management system includes a key management server 1430, which provides a key to the licensed computing node 1410 to decrypt the algorithm 320 and process local data 1420. In some embodiments, certain devices may be pre-provisioned with a key, thereby allowing the algorithm payload to be distributed without the need for a key management server by the core management system 140. This allows for deployment of the payload even when the core management system 140 cannot be contacted directly to obtain decryption keys or to confirm license validity, for example if the local environment does not have a reliable Internet connection. In some embodiments, license data may be stored on the blockchain to allow additional computing models.

Figure 15:
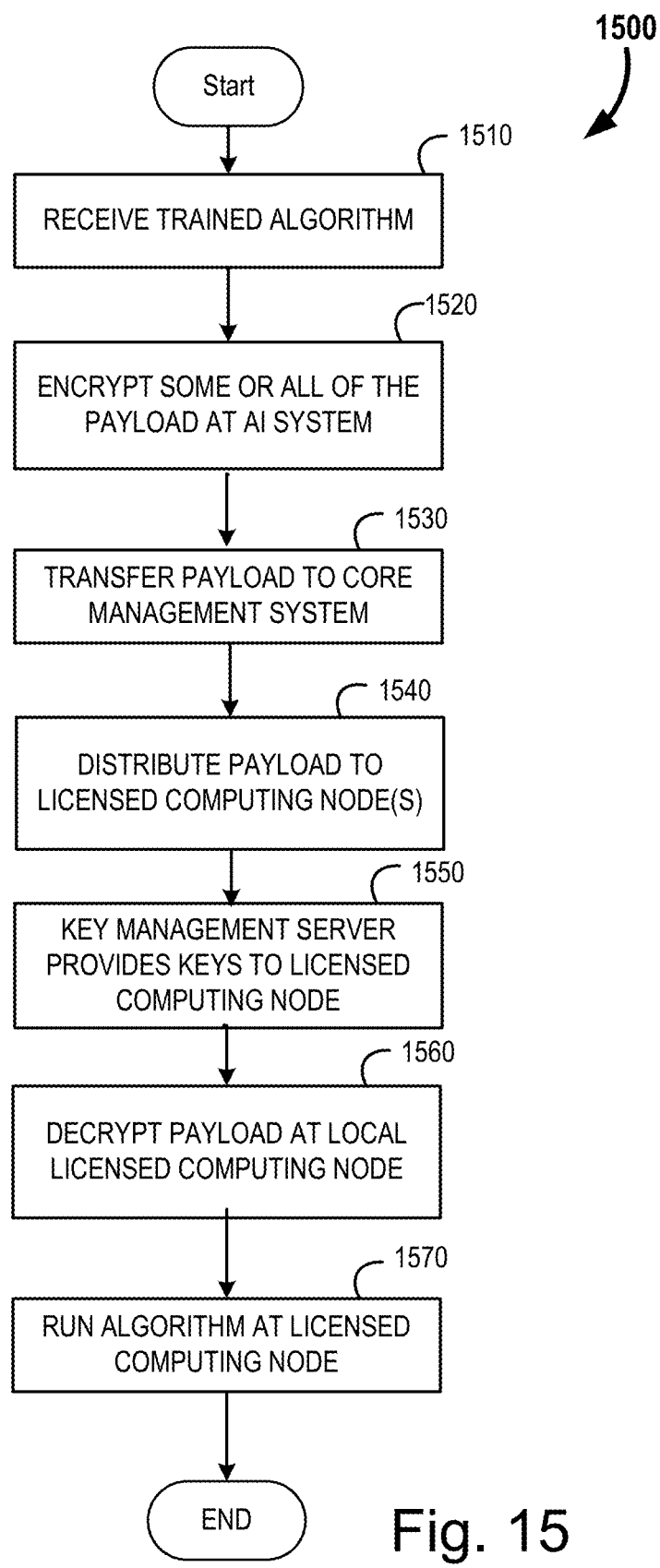
FIG. 15 is a flowchart for an example process of key management for the running of an algorithm on a computing capsule within a semi-trust environment, in accordance with some embodiments.

FIG. 15, in turn, provides an example process for deploying and running algorithms on licensed computing nodes, shown generally at 1500. In this example process, the trained algorithm is first received/generated by the algorithm developer (at 1510). This algorithm is encrypted in whole or in part (at 1520) in the zero-trust encryption node. The payload is provided to the core management system (at 1530), which then distributes it to one or more licensed computing nodes (at 1540). The key management server within the core management system provides the necessary keys to the appropriate licensed computing node(s) (at 1550). The licensed computing node(s) leverage the keys to decrypt the payload (at 1560), and run the algorithm on locally available data (at 1570).

Figure 16:
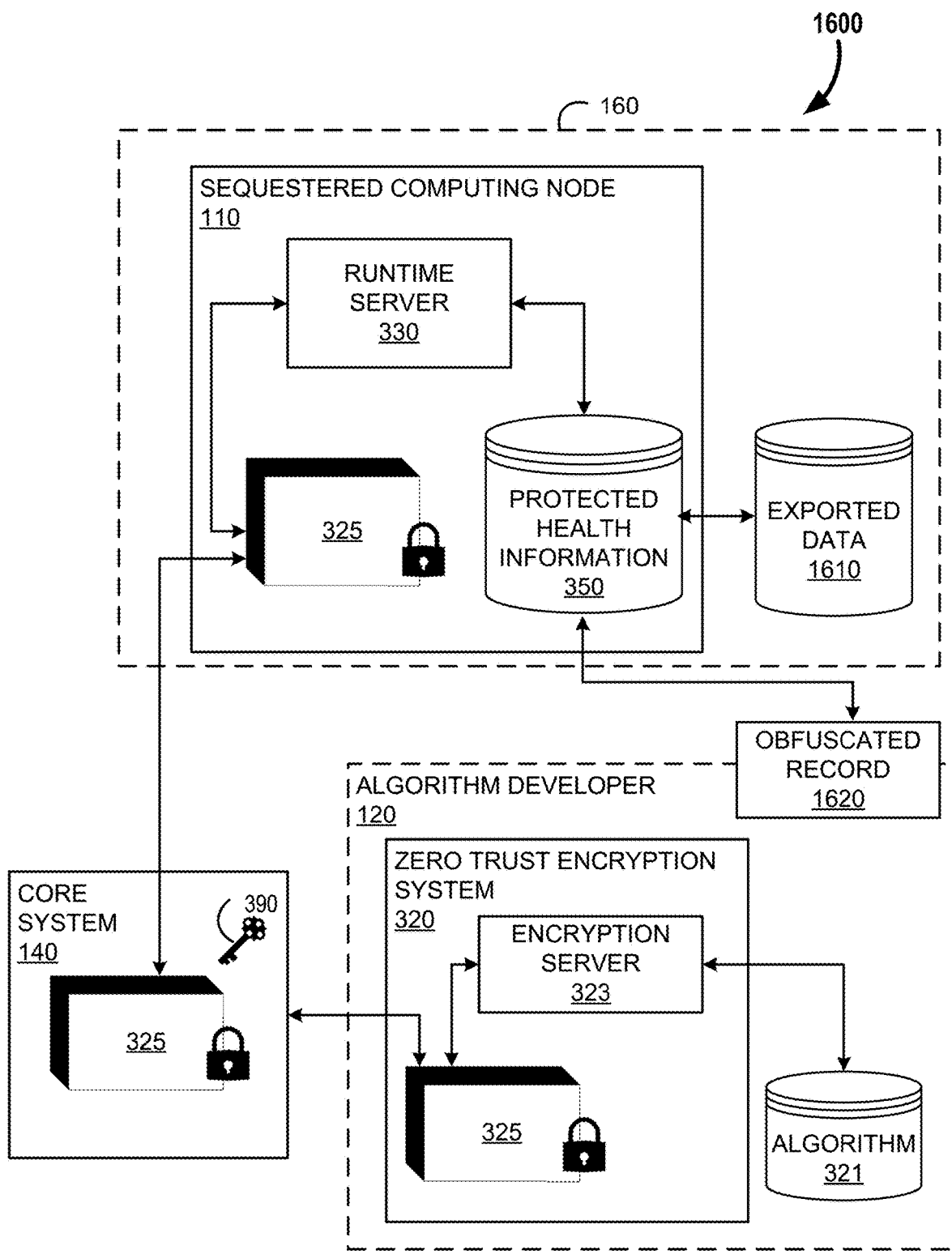
FIG. 16 is an example block diagram showing the running of an algorithm within a zero-trust environment with data reporting obfuscation, in accordance with some embodiments.

FIG. 16 provides an example diagram for the outputting of differential reports based upon audience privileges is provided, shown generally at 1600. In this example diagram, in a manner consistent with the previously described processing of datasets in a zero-trust environment, the algorithm developer 120 provides their algorithm 321 to an encryption server 323 within the zero-trust encryption system 320. This results in an encrypted payload 325. While the entire payload is illustrated as being encrypted, consistent with the various described it is possible that only portions of the algorithm may be encrypted. However, for the sake of brevity and clarity, only embodiments where the entire algorithm payloads are encrypted are illustrated.

The encrypted payload 325 is provided to the core management system 140, which also manages keys 390. The core management system 140 is unable to access and decrypt the payload 325. The core management system 140 manages the deployment of the payload to a proper data steward 160 for processing on their protected health information 350. The payload is provided to a sequestered computing node 110 within the data steward. Only when the payload is within the sequestered computing node 110 is it able to be decrypted. The data steward 160 is unable to access assets within the sequestered computing node 110, therefore the algorithm can be decrypted and used to process the protected information, for example PHI, without the data steward being able to access the algorithm.

The runtime server 330 processes the protected health information 350 using the decrypted algorithm, which is then purged from the sequestered computing node 110 after completed. The result of the processing of the protected information is output as exported data 1610, which is fully identifiable results. Additionally, obfuscated records 1620, which have the identifying information, and any other protected in formation, hashed is provided back to the algorithm developer 120. These obfuscated records 1620 are leveraged by the algorithm developer to validate the algorithm operation. A mapping between original record ID and the obfuscated ID may be held by the data steward or other permitted stakeholder (e.g. a regulatory agency) so that significant results that have been reported to the algorithm developer can be matched to actual records, enabling further action or inquiry to be undertaken.

Figure 17:
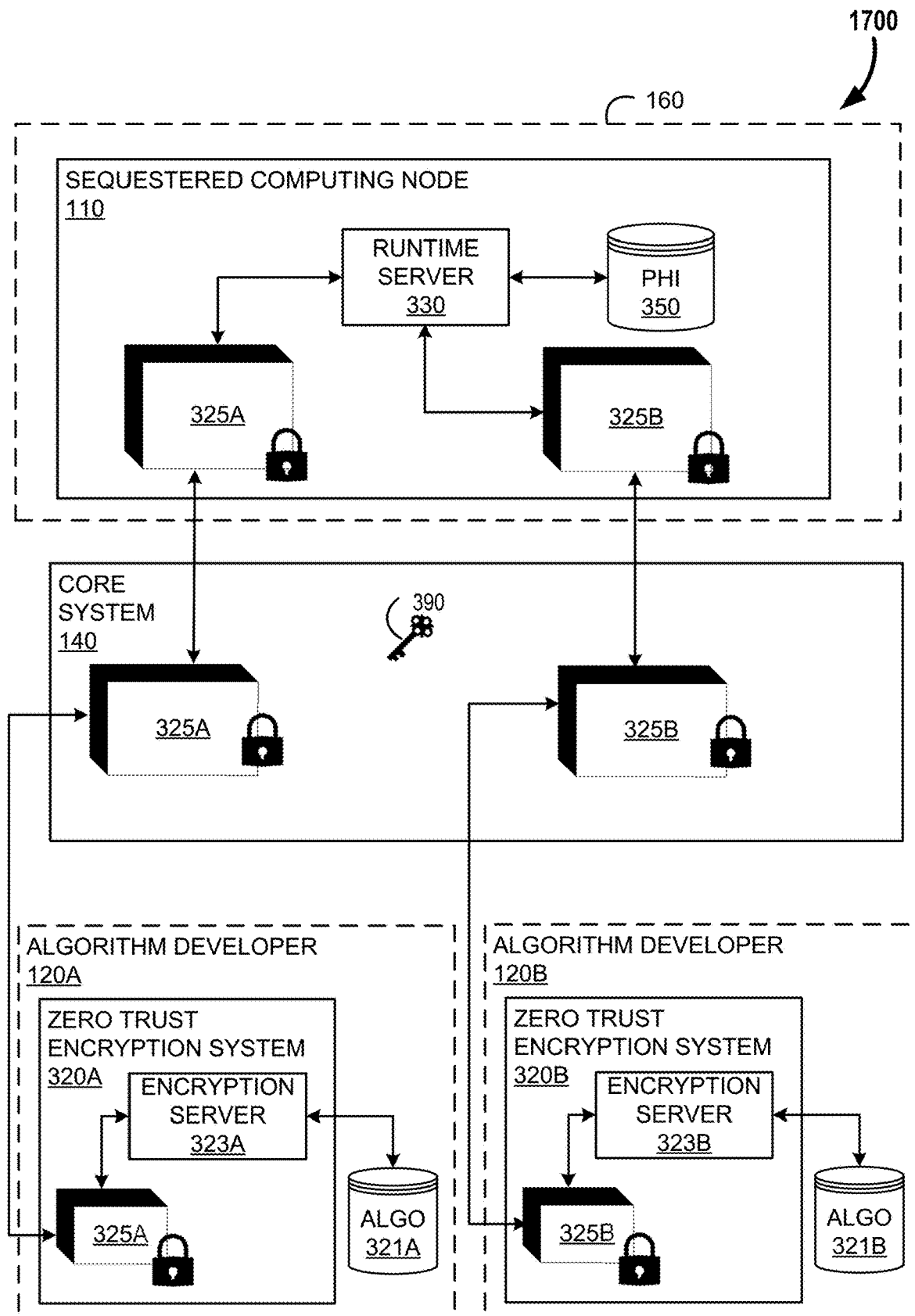
FIG. 17 is an example block diagram showing the dual algorithm operation on a single dataset within a zero-trust environment, in accordance with some embodiments.

Turning to FIG. 17, the processing of datasets with multiple algorithms is provided, shown generally at 1700. Similar to other disclosed systems, the algorithms 321A and 321B are encrypted by their respective encryption servers 323A and 323B within their respective algorithm developer's 120A and 120B zero-encryption systems 320A and 320B, respectively. Again, in this example diagram the entire algorithms 321A and 321B are shown as being encrypted 325A and 325B, respectively. However, it is within the scope of the disclosure that the alternate encryption techniques (portion encryption and bifurcation and segment encryption) are considered.

The core management system 140 received the multiple encrypted algorithms 235A and 325B. These algorithm packets are provided (again, in an encrypted and inaccessible format) to the data steward 160. When in the sequestered computing node 110, these algorithms may be decrypted and used by the runtime server 330 to process the protected health information 350. In some embodiments, the protected information, for example PHI, may be processed by the first algorithm 325A and in parallel by the second algorithm 325B. The results from these parallel processing may be compared to one another to validate findings, or otherwise achieve some computational advantage. For example, in many situations the outputs of multiple algorithms can be combined to create a stronger statistical signal (and therefore more accurate or useful results) than any single algorithm. For example, the first algorithm may process the protected information to yield a first result, and a second model renders a second result. These results may be combined to classify the results (e.g., a weighted sum of the algorithm results, or combining classification results independently). From a privacy and security perspective, the ability to combine signals within a secure encapsulated computing environment allows the creation of such ensemble results without the requirement to publish the individual intermediate results.

In alternate systems, the protected information may be processed by the first algorithm 325A, and the output of this processing may be a new dataset for processing by the second algorithm 325B. This is a particularly powerful technique in that the ability to share datasets between the two algorithm developers, which is required in traditional processing, requires a significant degree of trust between the parties (including significant contractual arrangements). This is particularly problematic in that the algorithm developers 120A and 120B are potentially direct competitors.

The output of this serial processing of protected information allows for the creation of advanced analytics pipelines on private data while protecting the intellectual property (IP) of all pipeline algorithmic components. For cases in which the output of any of the component algorithms is restricted for reasons of IP protection or privacy, a serial pipeline computed entirely within an encapsulated computing environment is advantageous. For example, a first algorithm might identify individuals, objects, or activities within image data and a second could compute on a combination of these outputs and other data within the enclave. It is easy to see that if the identities of individuals within these images needed to be protected, it would be preferable to run this serial pipeline entirely within an enclave.

Figure 18:
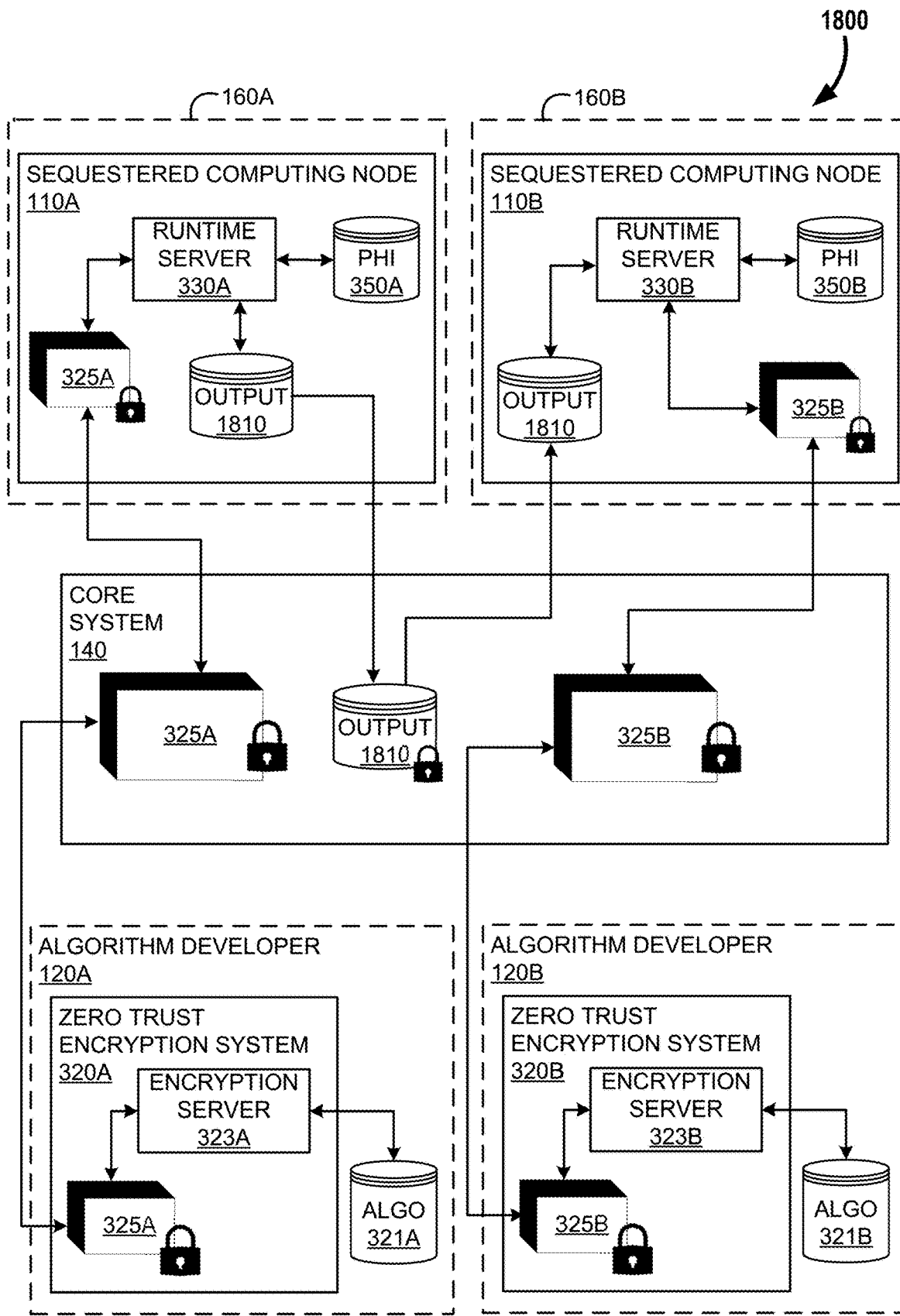
FIG. 18 is an example block diagram showing the chained running of algorithms on sets of data within multiple zero-trust environments, in accordance with some embodiments.

Turning now to FIG. 18, another example process for complex processing of different protected information, for example PHI, datasets by various algorithms is provided, shown generally at 1800. As with FIG. 17, the algorithms 321A and 321B are encrypted by their respective encryption servers 323A and 323B within their respective algorithm developers' 120A and 120B zero-encryption systems 320A and 320B, respectively. Again, in this example diagram the entire algorithms 321A and 321B are shown as being encrypted 325A and 325B, respectively.

These encrypted algorithms 325A and 325B are sent to the core management system 140 for routing to the proper data stewards. In this example system, the first algorithm 325A is provided to a first data steward 160A. The encrypted packet 325A is encapsulated in the sequestered computing node 110A, which is then decrypted and used by the runtime server 330A to process the protected health information 350A belonging to this first data steward 160A. This processing generates an output 1810. The output is encrypted within the data steward 160A environment and is then sent to the core management system 140 for routing. As with the algorithm payloads, these encrypted output reports 1810 are inaccessible to the core management system 140, therefore ensuring end-to-end protection of all sensitive data. This output data is then provided to the sequestered computing node 110B of a second data steward 160B. The output data is able to be decrypted only within the sequestered computing node 110B thereby ensuring the content of the output 1810 is not accessible by the second data steward 160B.

Within the sequestered computing node 110B, the output data 1810 may be processed along with protected information 350B of the second data steward 160B, using the runtime server 330B by the second algorithm 325B. In some embodiment, the output data may alter the second set of protected information 350B (or vice versa), and this modified dataset is used by the algorithm 325B for generating a final output. In alternate embodiments, the second algorithm 325B may consume the output dataset 1810 and the second set of protected health information 350B independently in order to generate a final output. The first methodology could be used to extract features from unstructured data in a dataset and then combine those features with other data in the data set to generate an output (for example a prediction or class determination). This type of pipeline is used often in healthcare applications in which the source data, such as clinical notes, are not necessarily represented in an ideal format for the second algorithm to operate on them. The second methodology could be used to create an ensemble classifier from multiple other algorithms, thus increasing the statistical strength of the output. This approach could also be used to simply compare the outputs of two algorithms that are designed to answer the same question.

Figure 19:
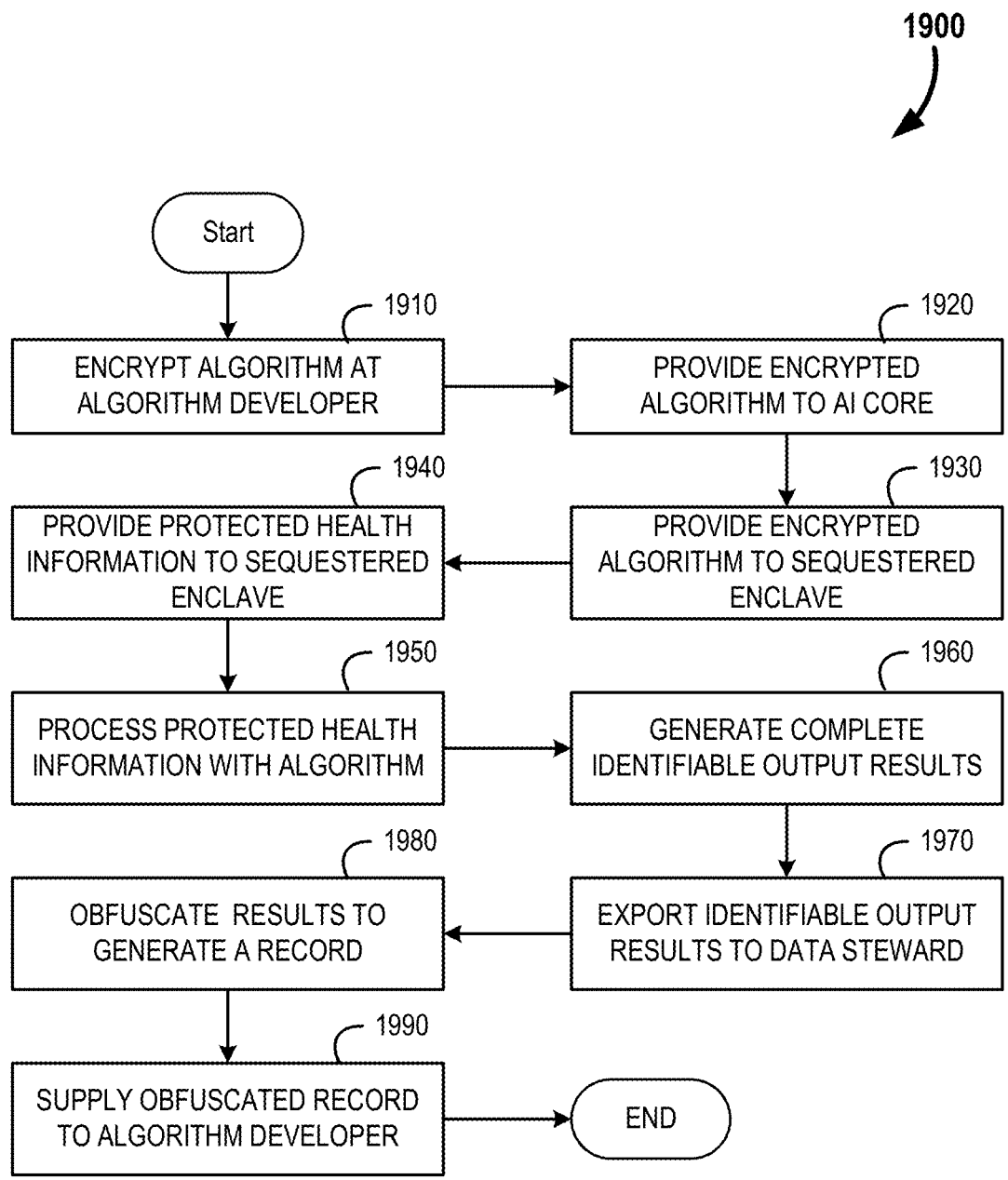
FIG. 19 is a flow diagram for the example process of running of an algorithm within a zero-trust environment with data reporting obfuscation, in accordance with some embodiments.

Turning now to FIG. 19, the process of generating obfuscated records for algorithm validation is provided, shown generally at 1900. In this example process an algorithm is encrypted at the location of the algorithm developer (at 1910). Again, this encryption may be for the entire payload, or may only be for sensitive algorithm elements (weights for example). The encrypted payload is provided to the core management system (at 1920), which then provides it to a sequestered enclave at a data steward (at 1930). Within the sequestered computing node, the encrypted payload is able to be decrypted, allowing the algorithm to be leveraged. The data steward also provides protected information to the sequestered enclave (at 1940).

The protected information is then processed by a runtime server using the algorithm (at 1950). This results in a new dataset being created (at 1960). The dataset includes identifying information (and possibly other sensitive patient information). This identifiable dataset is then exported, in its raw form, to the data steward (at 1970). However, the dataset may be additionally processed to generate an obfuscated record (at 1980). In this dataset, the identifying information is first hashed. Subsequently the entire record is encrypted for transfer of the obfuscated record back to the algorithm developer (at 1990). This record can be decrypted at the algorithm developer, however, the hashed identification information is unable to be accessed by the algorithm developer. The obfuscated record may be used by the algorithm developer to validate the algorithm, or for other analytics.

Figure 20:
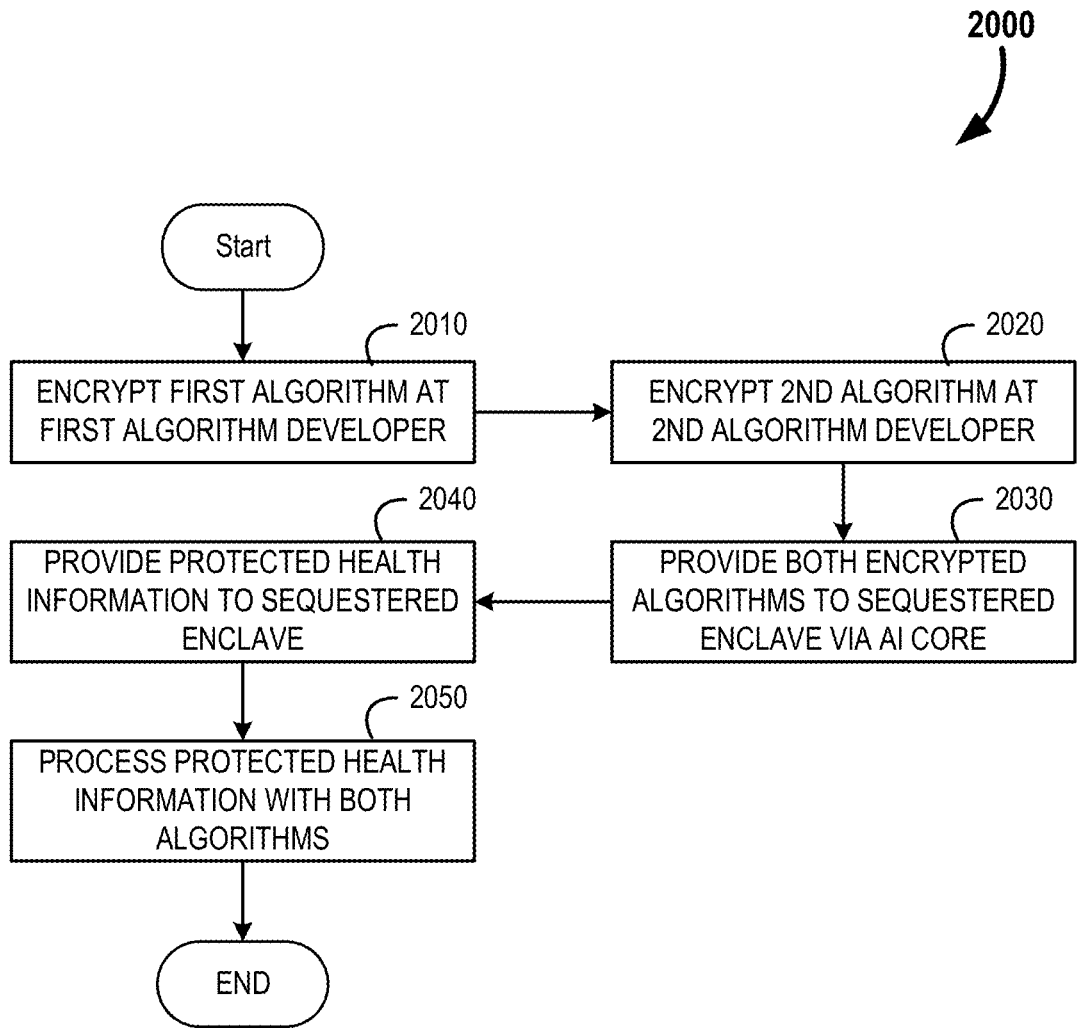
FIG. 20 is a flow diagram for the example process of dual algorithm operation on a single dataset within a zero-trust environment, in accordance with some embodiments.

FIG. 20 illustrates an example process for multi-algorithm processing of protected information within a single data steward, shown generally at 2000. As with other embodiments, the first steps of this process includes the encryption of algorithms at the first and second algorithm developers (at 2010 and 2020, respectively). These encrypted algorithms are provided to the core management system, which then provides both algorithms to a single data steward, and in particular to the sequestered computing node where the encrypted algorithms are able to be decrypted (at 2030).

The data steward also provides the protected information in their care to the sequestered enclave (at 2040). This protected information is then processed (at 2050) by both algorithms, either individually in parallel, or as a serial processing, where the output of one algorithm's processing is the input into the second algorithm.

Figure 21:
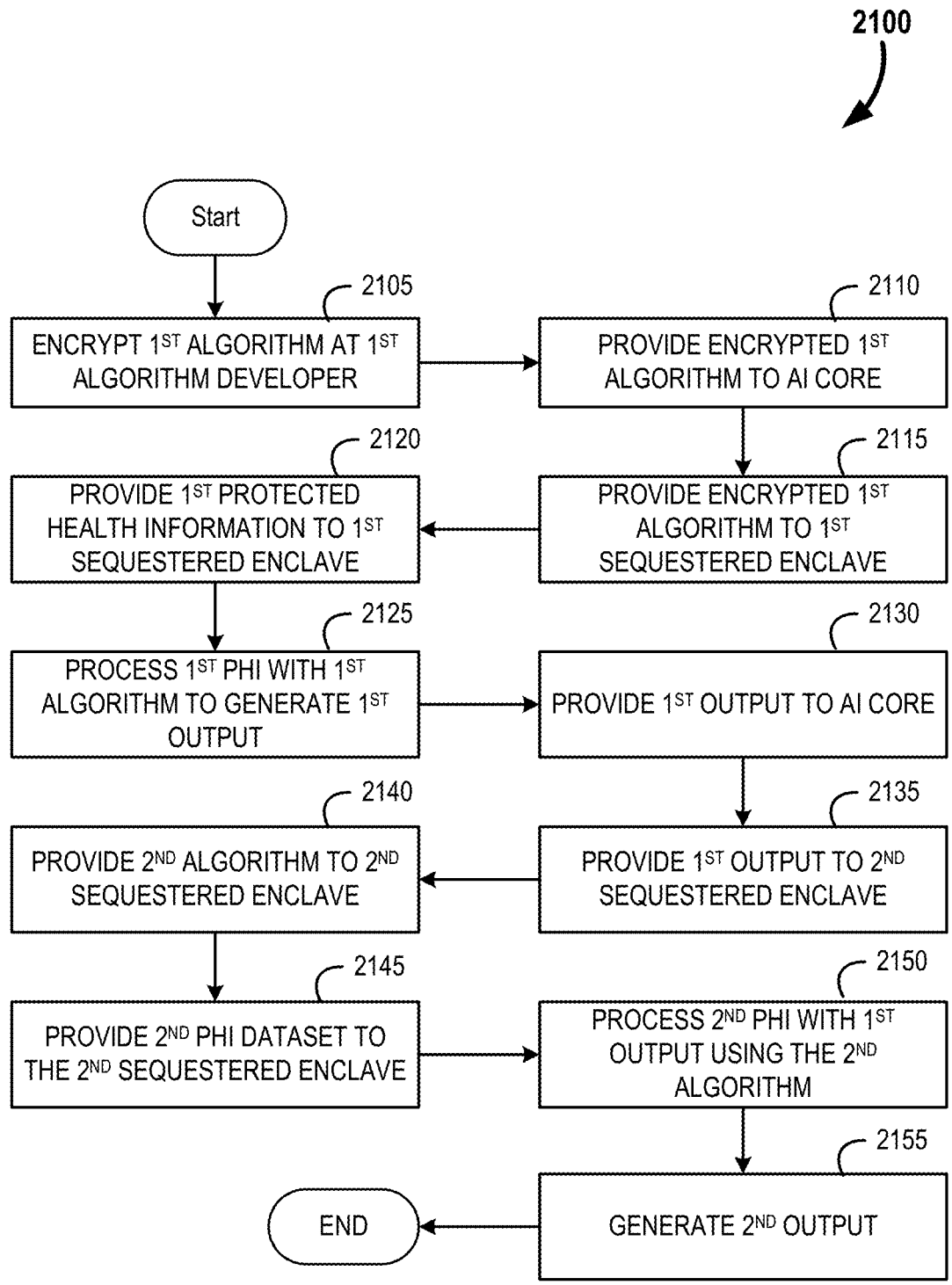
FIG. 21 is a flow diagram for the example process of chained running of algorithms on sets of data within multiple zero-trust environments, in accordance with some embodiments.

Turning to FIG. 21, an example process for multi algorithm on multiple datasets are provided, shown generally at 2100. In this example process a first algorithm is initially developed and then encrypted by an algorithm developer (at 2105). The encrypted algorithm is provided to the AI core management system (at 2110), which is then provided to a first data steward's sequestered enclave (at 2115).

The data steward provides their protected information to the sequestered computing node as well (at 2120). Once the algorithm is decrypted, the algorithms may process the protected information that is made available from the data steward (at 2125). This processing results in the generation of a first output. This output has identifiable information as well as report results. The identifiable information may be hashed, and subsequently the entire output is encrypted. The encrypted output is sent to the core management system (at 2130) and then subsequently routed to a second sequestered enclave that is present at a second data steward (at 2135).

A second algorithm, generated by a second algorithm developer and encrypted, is then transferred to this second sequestered enclave via the core management system (at 2140). Protected health information of this second data steward is also provided to the secured enclave (at 2145). At this stage, the sequestered computing node has access to the second algorithm, protected information from the second data steward, and the output of the first algorithm working upon the protected information from the first data steward. This second algorithm is then decrypted, and used to process both the output and the second set of protected information (at 2150). This results in the generation of a second output (at 2155) which may provide new insights that are unavailable from any one set of protected information.

Figure 22:
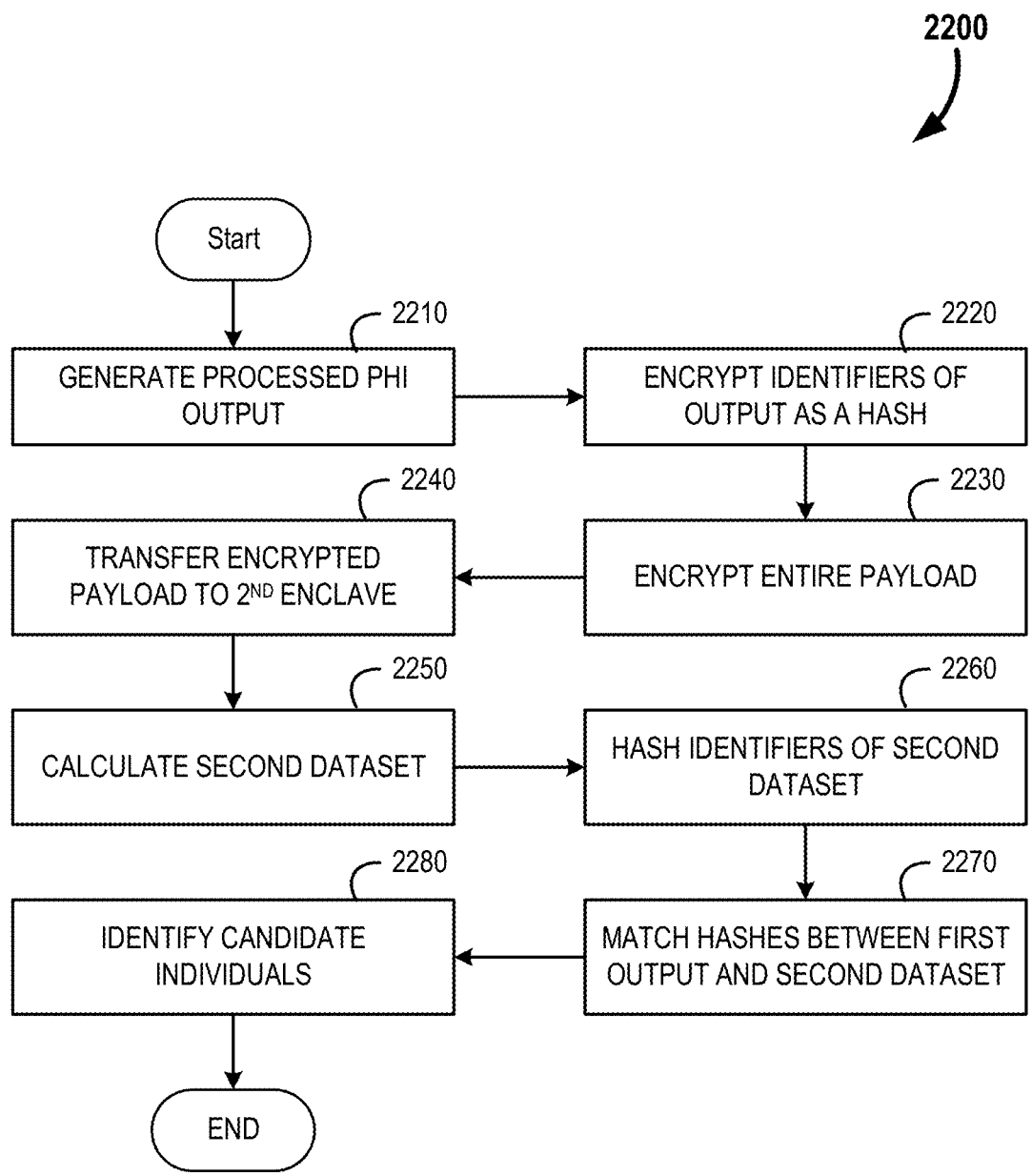
FIG. 22 is a flow diagram for the example process of linking of multiple processed datasets within multiple zero-trust environments, in accordance with some embodiments.

Turning now to FIG. 22, a system for matching outputs between differing processed protected information is disclosed, shown generally at 2200. In this example process, an algorithm is used to process the protected information of a first data steward in any manner previously disclosed (at 2210). The identifying N-fields of the processed dataset are then normalized, and then hashed (at 2220). The identifying information is generally a set of fields, each field containing a different identifier. For example, there may be fields for birthdate, name, social security number, weight, height, Medical Record Number (MRN), patient ID, and the like. Normalization may depend upon the field. For example, birthdate may be placed in a specific format, such as MM/DD/YYYY. Likewise, MRN may have all characters lowercased, and all spaces removed from the token string, for example.

Once all the fields are normalized, the hash is generated by encrypting these identifying fields, and then the entire payload is also encrypted (at 2230) so that anyone intercepting the output is unable to access the data contained therein. The encrypted payload is then transferred, via the core management system, to a second sequestered computing node (at 2250). A second dataset is calculated within the second enclave (at 2250). This may include the same algorithm operating on a different protected information (for example PHI) dataset, or an entirely different algorithm operating on the same or different protected information dataset. Regardless, the output from this second operation may also have the identifier fields hashed (at 2260) to prevent others from having access to the sensitive identification data.

The next step is to match records by individual between the first outputted dataset and the second outputted dataset (at 2270). There are at least two methods disclosed herein to enable matching of dataset hashes, as will be discussed in relation to FIGS. 23A and 23B, respectively. After the hashes are matched, the individual candidates can be identified (at 2280). This method allows the serial application of complementary algorithms on distinct, private datasets, neither of which is visible to the one or more algorithm owners, applied at to the matched records. The applications of this are numerous: For example, an insurance company's data might be processed by a first algorithm to create a vector of features for each patient in the data set (diagnoses, history of procedures, costs, etc.). This data set might be indexed by a patient ID (ID-A) that is unique to the payor and can't be directly matched with patient IDs in other datasets. This ID-A would be encrypted (distance preserving hash, homomorphic encrypted, etc.) along with the output vector. A second algorithm would operate on a second data set, for example from a healthcare provider system, combining the first results with the second data set to generate a new result set. In some embodiments, the hashes might be matched before the second computation is performed. In other embodiments, the two sets of data vectors are combined as an outer product (possible reduced in size by partial matching). All possible results are tabulated and the reduction to correctly matched patient records is performed outside the enclave. (It is recognized that an outer multiplication might result in a large resultant dataset, but there are many applications in which this would not be a significant constraint). This pattern would also apply to a banking use case in which features from one or more transactions in one or more banks are extracted by a first algorithm, and combined with a regulator's, or other central watchdog's, data to compute with a second algorithm to detect fraudulent or suspicious transactions.

Figure 23A:
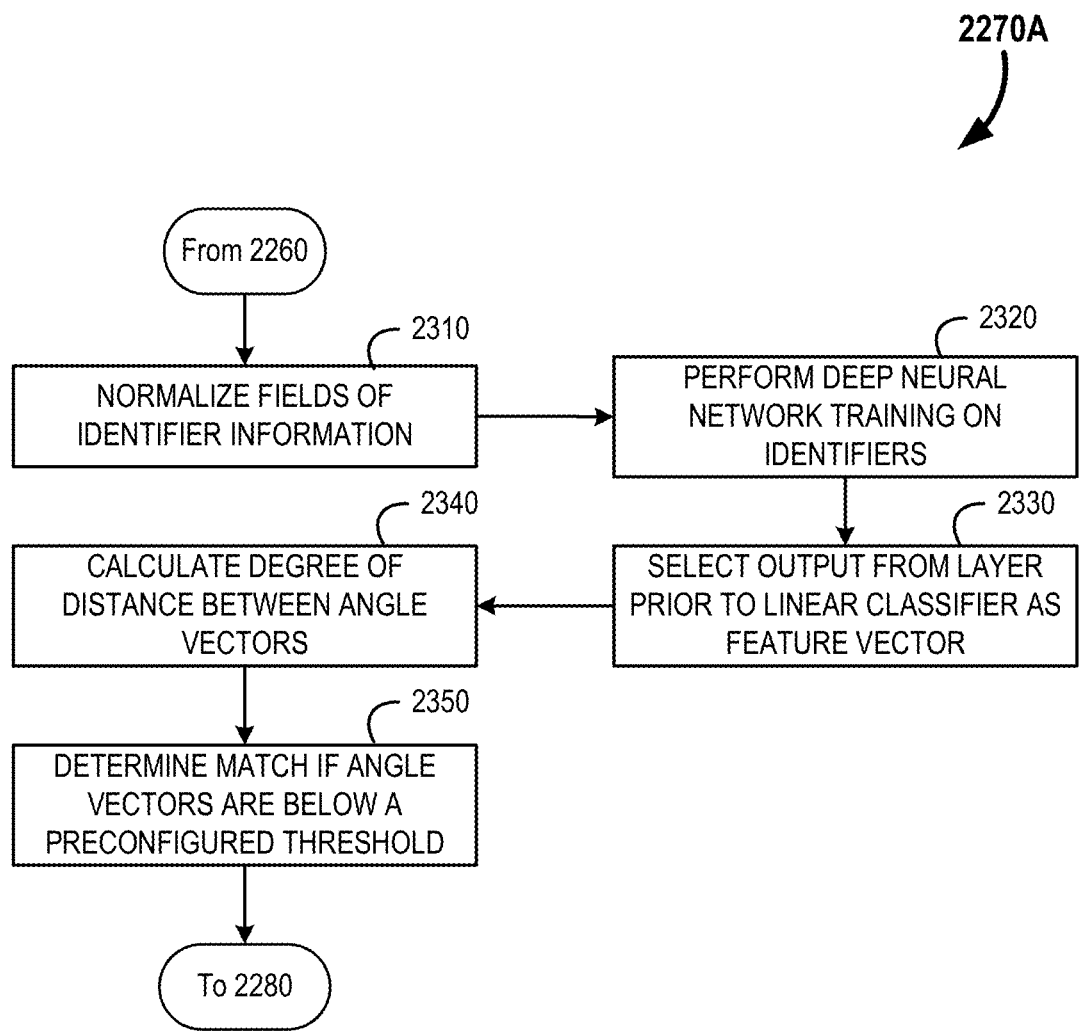
FIGS. 23A and 23B are flow diagrams showing two alternate example processes of matching identifying information between datasets, in accordance with some embodiments.
Figure 23B:
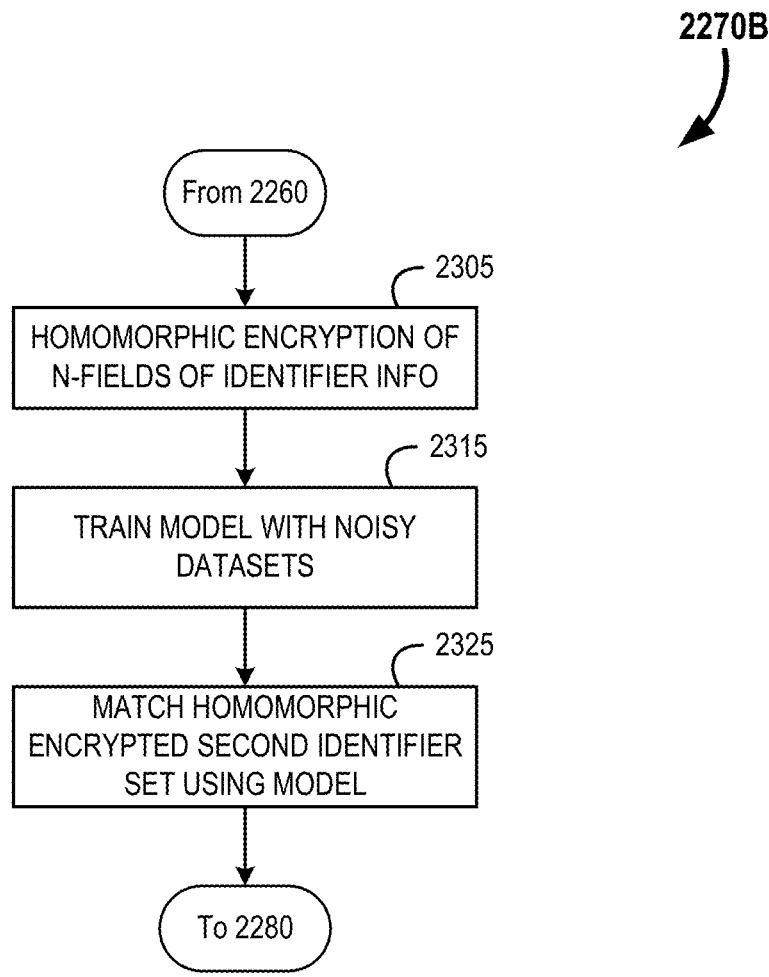

Turning now to FIGS. 23A and 23B, two methods for matching individual identifying hashes are provided, shown generally at 2270A and 2270B respectively. As the identifying information is hashed by each data steward, the other party cannot disambiguate the data in order to link up output results contained in the report with any given patient. As such, data can be more readily transferred without the need for extensive confidentiality agreements and protections. However, there is great value in being able to link up records, as exemplified above.

In FIG. 23A, the identifier information fields on a training set of data are normalized (at 2310), in the same manner as previously described. This allows for training of a deep neural network AI model (at 2320). This model generally provides a binary output on if two normalized sets of hashed data are the same or not. In such a model the last layer is generally a linear classifier. The output from the layer just before the linear classifier may be leveraged in this process. This output is a set of feature vectors. These feature vectors generated from the model operating on a hash of identifiers is selected for each output dataset (at 2330). Any two-feature vector sets from one dataset compared to the other dataset are then compared, and the degree of distance between the angle of the vectors is calculated (at 2340). This degree of angle distance indicates how closely the two hashes are toward one another. Therefore, if the cosine angle distance between the two vectors is below a preconfigured threshold, the system may determine there is a match between the two given hashes (at 2350). The preconfigured threshold may be modified or computed based on the desired properties of the output (for example, an application intended to find the most complete list of candidates for a therapy might tolerate more false positives and therefore use a lower threshold, while a public health screening strategy would desire to minimize costs by using a higher threshold with fewer false positives, but potentially missing some true positives).

In contrast, the method of FIG. 23B relies upon homomorphic encryption. In this example process, the N identification fields of the given record are homomorphically encrypted (at 2305). A machine learning model is then trained using a noisy dataset (e.g., a dataset with erroneous and missing fields of data) to compare and identify matching homomorphically encrypted hashes (at 2315). After being fully trained, the model may be used to match the hashes of one dataset to those of a second dataset (at 2325).

Regardless of method employed, the ability to match individual patients within two datasets allows different data stewards to combine, compare and contrast their processed data without revealing to any other party the identity of their patients. This allows compliance with regulations, such as HIPAA, while allowing for unprecedented analytics with disparate parties.

Figure 24A:
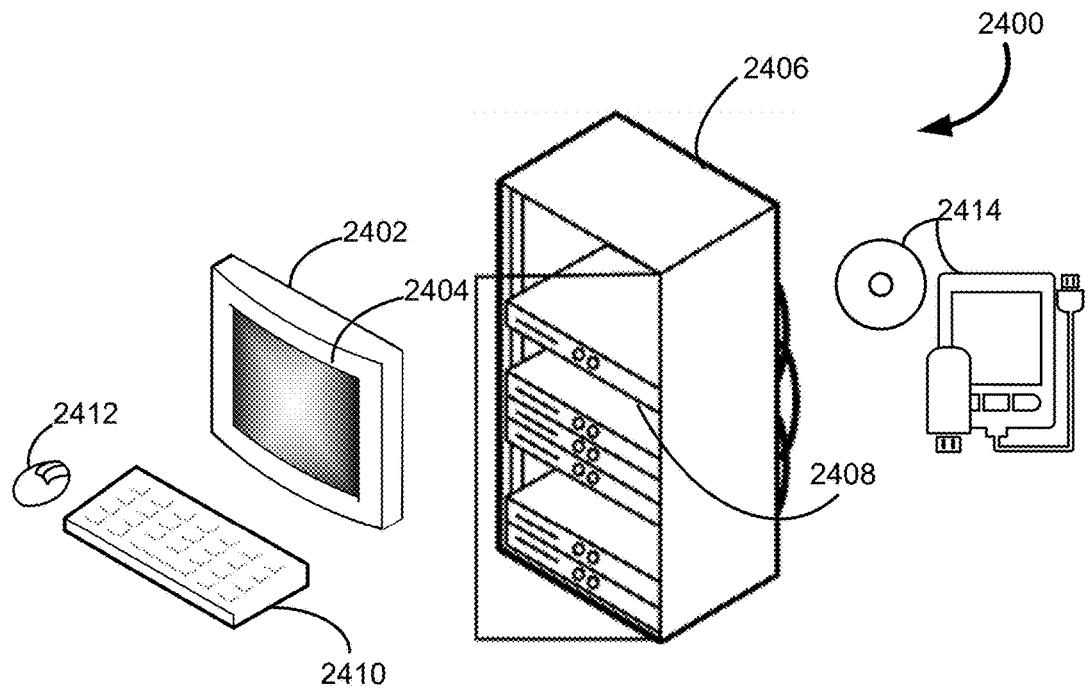
FIGS. 24A and 24B are illustrations of computer systems capable of implementing the zero-trust computing, in accordance with some embodiments.
Figure 24B:
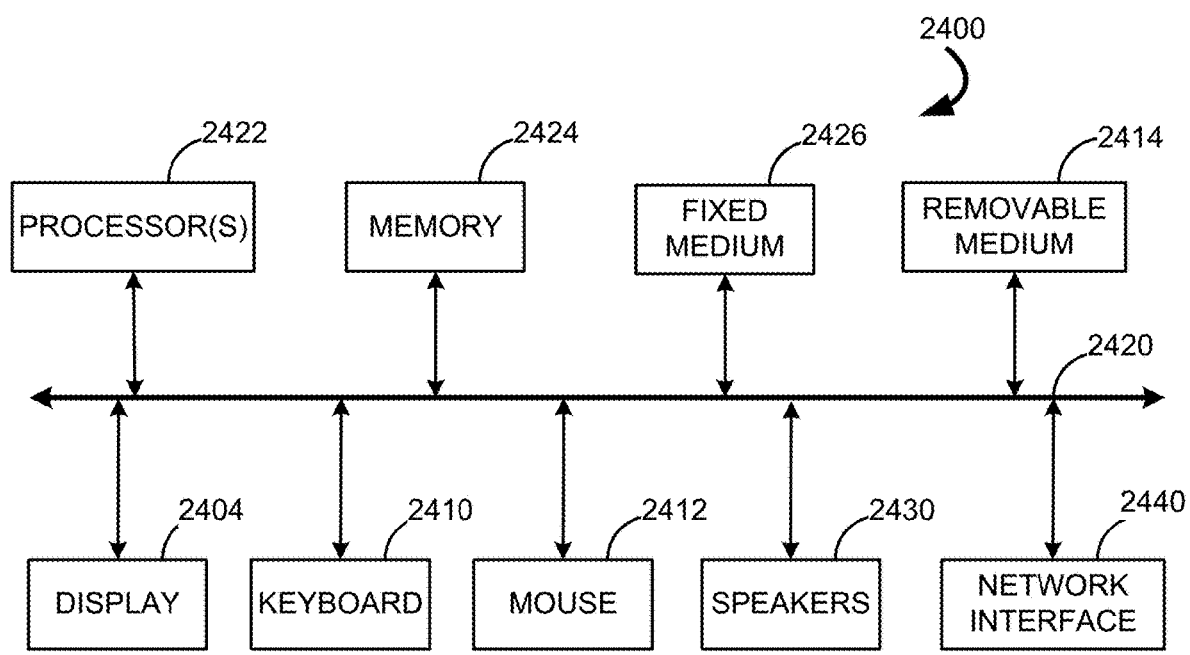

Now that the systems and methods for zero-trust computing have been provided, attention shall now be focused upon apparatuses capable of executing the above functions in real-time. To facilitate this discussion, FIGS. 24A and 24B illustrate a Computer System 2400, which is suitable for implementing embodiments of the present invention. FIG. 24A shows one possible physical form of the Computer System 2400. Of course, the Computer System 2400 may have many physical forms ranging from a printed circuit board, an integrated circuit, and a small handheld device up to a huge supercomputer. Computer system 2400 may include a Monitor 2402, a Display 2404, a Housing 2406, server blades including one or more storage Drives 2408, a Keyboard 2410, and a Mouse 2412. Medium 2414 is a computer-readable medium used to transfer data to and from Computer System 2400.

FIG. 24B is an example of a block diagram for Computer System 2400. Attached to System Bus 2420 are a wide variety of subsystems. Processor(s) 2422 (also referred to as central processing units, or CPUs) are coupled to storage devices, including Memory 2424. Memory 2424 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 2426 may also be coupled bi-directionally to the Processor 2422; it provides additional data storage capacity and may also include any of the computer-readable media described below. Fixed Medium 2426 may be used to store programs, data, and the like and is typically a secondary storage medium (such as a hard disk) that is slower than primary storage. It will be appreciated that the information retained within Fixed Medium 2426 may, in appropriate cases, be incorporated in standard fashion as virtual memory in Memory 2424. Removable Medium 2414 may take the form of any of the computer-readable media described below.

Processor 2422 is also coupled to a variety of input/output devices, such as Display 2404, Keyboard 2410, Mouse 2412 and Speakers 2430. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 2422 optionally may be coupled to another computer or telecommunications network using Network Interface 2440. With such a Network Interface 2440, it is contemplated that the Processor 2422 might receive information from the network, or might output information to the network in the course of performing the above-described zero-trust processing of protected information, for example PHI. Furthermore, method embodiments of the present invention may execute solely upon Processor 2422 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 2400 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method of processing protected information comprising:
    providing an encrypted first algorithm to a core management system from a first algorithm developer, wherein the core management system is unable to decrypt the first algorithm;
    providing an encrypted second algorithm to the core management system from a second algorithm developer, wherein the core management system is unable to decrypt the second algorithm;
    routing the encrypted first and second algorithm to a sequestered computing node;
    providing a set of protected information to the sequestered computing node;
    decrypting the first and second algorithms in the sequestered computing node; and
    processing the set of protected information using the encrypted first and second algorithm.

2. The method of claim 1, wherein the sequestered computing node is located within a data steward infrastructure.

3. The method of claim 2, wherein the sequestered computing node is inaccessible by the data steward.

4. The method of claim 2, wherein the data steward is a healthcare organization.

5. The method of claim 1, wherein the first and the second algorithms are machine learning models.

6. The method of claim 1, wherein the core management system supplies keys for the sequestered computing node.

7. The method of claim 1, wherein the processing includes parallel processing of the protected information through the first and second algorithms to generate a first and a second output.

8. The method of claim 1, wherein the processing includes processing of the protected information through the first algorithm to generate a first output and processing the first output through the second algorithm to generate a second output.

9. The method of claim 1, wherein the sequestered computing node is at least two sequestered computing nodes located within the infrastructure of at least two data stewards.

10. The method of claim 9, further comprising:
generating an output at a first sequestered computing node;
encrypting the output, providing the encrypted output to the core management system;
transferring the encrypted output to a second sequestered computing node from the core management system;
decrypting the output within the second sequestered computing node; and
processing a second data set using the output and at the second algorithm.

11. A computerized system for processing protected information comprising:
a server within a data steward's infrastructure, wherein the server hosts a sequestered computing node which is inaccessible by the data steward, the server configured to:
receive, in the sequestered computing node, an encrypted first and second algorithm from a core management system from a first and second algorithm developer, respectively, wherein the core management system is unable to decrypt the first or the second algorithm;
receive a set of protected information, in the sequestered computing node, from the data steward;
decrypt the first and second algorithms in the sequestered computing node; and
process the set of protected information using the encrypted first and second algorithm.

12. The system of claim 11, wherein the sequestered computing node is a virtual machine.

13. The system of claim 11, wherein the set of protected information is encrypted by the data steward.

14. The system of claim 11, wherein the data steward is a healthcare organization.

15. The system of claim 11, wherein the first and the second algorithms are machine learning models.

16. The system of claim 11, wherein the core management system supplies keys for the sequestered computing node.

17. The system of claim 11, wherein the processing includes parallel processing of the protected information through the first and second algorithms to generate a first and a second output.

18. The system of claim 11, wherein the processing includes processing of the protected information through the first algorithm to generate a first output and processing the first output through the second algorithm to generate a second output.

19. The system of claim 11, further comprising a second server within a second data steward's infrastructure hosting a second sequestered computing node.

20. The system of claim 19, wherein the first sequestered computing node generates an output, encrypts the output, and provides the encrypted output to the core management system, and wherein the core management system transfers the encrypted output to the second sequestered computing node, and wherein the second sequestered computing node decrypts the output and processes a second data set using the output and at the second algorithm.

21. A computerized method for obfuscating outputs of an algorithm comprising:
receiving an encrypted algorithm from an algorithm developer;
providing the encrypted algorithm to a sequestered computing node located within a data steward's infrastructure, wherein the sequestered computing node receives encrypted protected information from the data steward, yet the sequestered computing node is inaccessible by the data steward;
providing decryption keys for the sequestered computing node;
receiving identifiable results from the sequestered computing node as a result of the protected information being processed by the algorithm;
obfuscating the results to generate a record; and
supplying obfuscated record to the algorithm developer.

22. The method of claim 21, wherein the sequestered computing node is a virtual machine.

23. The method of claim 21, wherein the obfuscation includes data encryption.

24. The method of claim 21, wherein the obfuscation includes tokenization.

25. The method of claim 21, wherein the obfuscation includes hashing sensitive information in the record.

* * * * *